(12) United States Patent
Diamant et al.

(10) Patent No.: US 12,045,611 B1
(45) Date of Patent: Jul. 23, 2024

(54) RECONFIGURABLE NEURAL NETWORK PROCESSING BASED ON SUBGRAPH RECOGNITION

(71) Applicant: Amazon Technologies, Inc., Seattle, WA (US)

(72) Inventors: Ron Diamant, Santa Clara, CA (US); Hongbin Zheng, San Jose, CA (US); Drazen Borkovic, Los Altos, CA (US); Haichen Li, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/231,024

(22) Filed: Aug. 7, 2023

Related U.S. Application Data

(62) Division of application No. 17/361,992, filed on Jun. 29, 2021, now Pat. No. 11,782,706.

(51) Int. Cl.
*G06F 9/30* (2018.01)
*G06F 7/548* (2006.01)
(Continued)

(52) U.S. Cl.
CPC ............ *G06F 9/3001* (2013.01); *G06F 7/548* (2013.01); *G06F 8/433* (2013.01); *G06F 8/443* (2013.01); *G06N 3/04* (2013.01); *G06N 3/063* (2013.01)

(58) Field of Classification Search
CPC ..... G06F 9/3001; G06F 9/3818; G06N 3/063; G06N 3/04
See application file for complete search history.

(56) References Cited

U.S. PATENT DOCUMENTS 6,026,241 A    2/2000 Chow et al.
6,381,739 B1   4/2002 Breternitz, Jr. et al.
(Continued)

FOREIGN PATENT DOCUMENTS

WO    2015019364 A2    2/2015

OTHER PUBLICATIONS

U.S. Appl. No. 17/361,992, Patent Application, "Reconfigurable Neural Network Processing Based on Subgraph Recognition", filed Jun. 29, 2021.
(Continued)

*Primary Examiner* — Jacob Petranek
(74) *Attorney, Agent, or Firm* — Kilpatrick Townsend & Stockton LLP

(57) ABSTRACT

In one example, a method comprises: receiving input codes, wherein the input codes represent a computational dataflow graph; traversing the computational dataflow graph to identify single-entry-single-exit (SESE) subgraphs of the computational dataflow graph, wherein each SESE subgraph has a sequence of nodes comprising a root node and a child node and representing a sequence of element-wise operators, wherein the root node receives a single input tensor, and wherein the child node outputs a single output tensor; determining a merged operator for each SESE subgraph; and generating executable instructions for the computational dataflow graph to be executed by a hardware accelerator having a first execution unit and a second execution unit, wherein the executable instructions comprise first executable instructions for the merged operators targeted at the first execution unit, and second executable instructions for other operators of the computational dataflow graph targeted at the second execution unit.

20 Claims, 22 Drawing Sheets

(51) Int. Cl.
  *G06F 8/41* (2018.01)
  *G06N 3/04* (2023.01)
  *G06N 3/063* (2023.01)

(56) References Cited

U.S. PATENT DOCUMENTS

| | | | |
|---|---|---|---|
| 8,190,669 B1 * | 5/2012 | Oberman | G06F 9/3895 |
| | | | 708/277 |
| 8,826,255 B1 | 9/2014 | Avadhanula et al. | |
| 10,860,925 B2 | 12/2020 | Tucker et al. | |
| 11,714,992 B1 | 8/2023 | Heaton et al. | |
| 2006/0095722 A1 | 5/2006 | Biles et al. | |
| 2008/0049022 A1 | 2/2008 | Sherb et al. | |
| 2013/0185345 A1 * | 7/2013 | Tsadik | G06F 7/544 |
| | | | 708/235 |
| 2015/0302075 A1 | 10/2015 | Schechter et al. | |
| 2017/0124452 A1 | 5/2017 | Tucker et al. | |
| 2018/0246988 A1 | 8/2018 | Johnson et al. | |
| 2019/0286973 A1 | 9/2019 | Kovvuri et al. | |
| 2019/0303153 A1 | 10/2019 | Halpern et al. | |
| 2020/0117465 A1 | 4/2020 | Cassidy et al. | |
| 2020/0117981 A1 | 4/2020 | Arthur et al. | |
| 2020/0160144 A1 | 5/2020 | Gutfreund et al. | |
| 2021/0374143 A1 | 12/2021 | Neill | |
| 2021/0390461 A1 | 12/2021 | Harris et al. | |
| 2022/0383082 A1 | 12/2022 | Zhang et al. | |

OTHER PUBLICATIONS

U.S. Appl. No. 16/219,760, Patent Application, "Neural Network Processing Based on Subgraph Recognition", filed Dec. 13, 2018.
Non-Final Office Action, U.S. Appl. No. 16/219,760, 16 pages, filed May 23, 2022.
Final Office Action, U.S. Appl. No. 16/219,760, 19 pages, filed Dec. 12, 2022.
Notice of Allowance, U.S. Appl. No. 16/219,760, 8 pages, filed Feb. 27, 2023.
Notice of Allowance, U.S. Appl. No. 17/361,992, 9 pages, filed Jun. 5, 2023.

* cited by examiner

RECONFIGURABLE NEURAL NETWORK PROCESSING BASED ON SUBGRAPH RECOGNITION

CROSS-REFERENCE TO RELATED APPLICATION

This application claims priority to and is a divisional of U.S. patent application Ser. No. 17/361,992 filed Jun. 29, 2021, and entitled "RECONFIGURABLE NEURAL NETWORK PROCESSING BASED ON SUBGRAPH RECOGNITION," the content of which is hereby incorporated by reference in its entirety for all purposes.

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network may include thousands of processing nodes and millions of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily optimized to provide the result from one computation unit directly to another computation unit. Often, the result must first be written to a memory and then read back. Although GPUs can have better response times than CPUs, it would still be desirable to improve the execution time of a neural network. Recently, special-purpose integrated circuit devices, such as a neural network hardware accelerator, have been developed to execute neural networks more efficiently than either CPUs or GPUs.

BRIEF DESCRIPTION OF THE DRAWINGS

Various embodiments in accordance with the present disclosure will be described with reference to the drawings.

DETAILED DESCRIPTION

Figure 1:
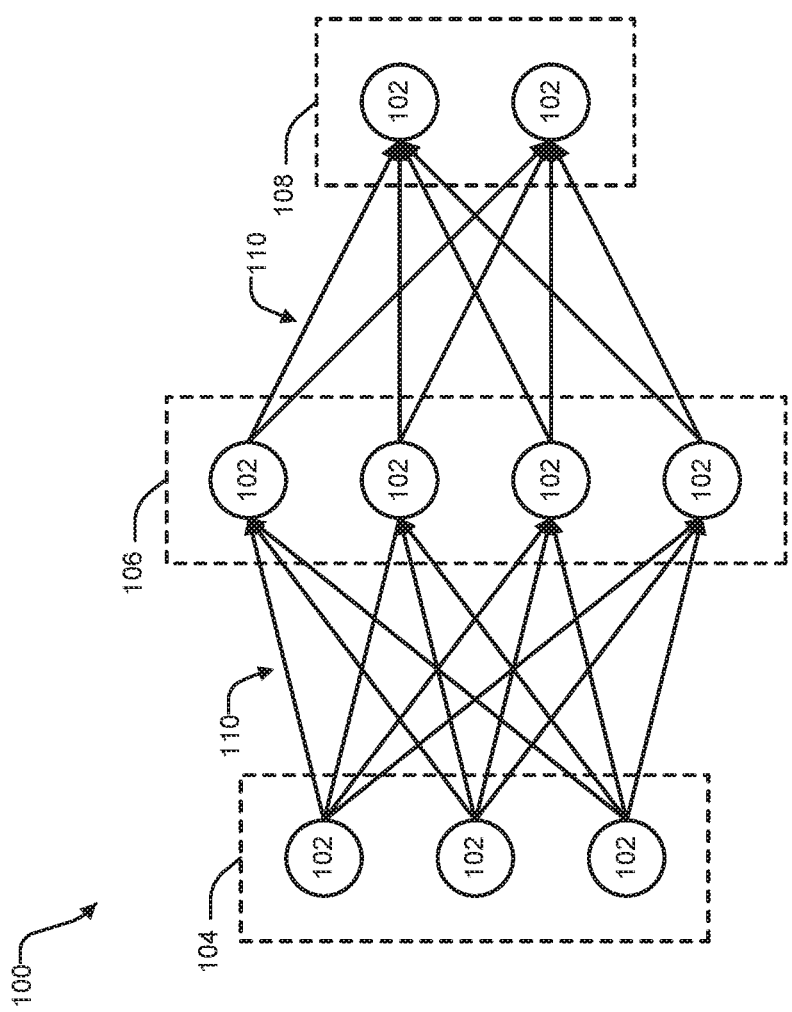
FIG. 1 illustrates an example of a computational flow model for a neural network.

Neural networks can include many interconnected operators of several different operator types to support a neural network operation. One type of operator may be an element-wise operator, which performs the same operation on each data element of the input tensor (e.g., passing the data element to an activation function, adding or multiplying two corresponding data elements in two tensors having the same dimensions, adding or multiplying each data element with the same constant, etc.) to generate a corresponding data element of the output tensor. Another type of operator may be a reduce-like operator, which can perform different operations on different data elements of an input tensor to generate an output tensor. Examples of reduce-like operators can include matrix multiplication (e.g., matmul) between two input tensors, a pooling or a matrix contraction operation to reduce the size of the input tensor, etc.

A neural network can be represented by multiple sequences of operators of different types, which together can form a dataflow graph of the neural network. For example, to perform the computations for a neural network layer of a convolutional neural network, matmul operations and summation operations can first be performed between a weight tensor and different portions of an input tensor at different stride locations to generate an intermediate output tensor. An additional operation can then be performed to add each data element of the intermediate output tensor with a constant (e.g., a bias). The intermediate output tensor with the bias added can then be input into an activation function to generate an output tensor for the neural network layer.

A neural network can be implemented on a neural network hardware accelerator. Specifically, a compiler can compile input codes representing a neural network dataflow graph into executable instructions, which can be executed by the neural network hardware accelerator to perform computations for the neural network. A neural network hardware accelerator can have computation and memory resources optimized to speed up the neural network computations. For example, the neural network hardware accelerator may include multiple computation engines, with each computation engine including arithmetic circuits (e.g., adder, multiplier, etc.), to perform computations on a data element of the input tensor in parallel, as part of the execution of instructions of a neural network. In addition, the neural network hardware accelerator can also include an on-chip memory to provide intermediate storage for the input and output of the neural network computations, to reduce the transfer of data to and from an off-chip memory (e.g., a dynamic random access memory (DRAM)) that typically incurs substantial transfer latencies. All of these can speed up the neural network computations, as well as the applications (e.g., inferencing, classification, etc.) that rely on the results of the neural network computations.

While a neural network hardware accelerator can speed up the neural network computations, there are various bottlenecks that can slow down the neural network computations. For example, as described above, a neural network typically includes a sequence of operators, in which the outputs of one operator are fed to another operator as inputs. Given the data dependency between the operators, these operators may be executed at the computation engines sequentially instead of in parallel, which increases the total execution time. Moreover, the execution of each operator may also involve fetching data to and from the on-chip memory (or off-chip memory), which further adds to the total completion time of the neural network computations.

The examples described herein provide methods, systems, and other techniques of compiling and executing a neural network dataflow graph that can address at least some of the issues described above. In some examples, a neural network hardware accelerator includes a hardware computation engine, merged operator mapping tables, and a controller. The computation engine includes arithmetic circuits to perform computations for neural network operators. Each merged operator mapping table can provide a piece-wise polynomial approximation of a neural network single-entry-single-exit (SESE) subgraph. The subgraph receives a single input tensor and outputs a single output tensor, and includes a sequence of element-wise neural network operators, such that each data element of the input tensor to the neural network subgraph can be processed by a same sequence of operations to generate a corresponding data element of the output tensor.

The neural network hardware accelerator further includes an instruction decoder and an instruction schema mapping table. The instruction decoder can extract an opcode from an instruction. The instruction scheme mapping table can map different opcodes to different instruction schemas, where a first opcode is mapped to a first instruction schema that refers to a first merged operator mapping table and first operands to be input to the first merged operator mapping table, and where a second opcode is mapped to a second instruction schema that defines operands to be input to the computation engine.

The controller can receive an instruction of an instruction program for a neural network, use the instruction decoder to extract an opcode of the instruction, and then retrieve an instruction schema from the instruction schema mapping table based on the opcode. The controller can also extract the operands from the instruction based on the instruction schema. If the instruction schema refers to a merged operator mapping table, the controller can forward the operands to the merged operator mapping table as inputs to generate outputs. On the other hand, if the instruction schema does not refer to a merged operator mapping table, the controller can forward the operands and the opcode to the computation engine, which can then perform a set of arithmetic operations based on the opcode and the operands to generate outputs.

In some examples, the computation engine can be configured to perform arithmetic operations for non-element-wise neural network operators, such as reduce-like neural network operators (e.g., summation of multiple input tensors, a matmul operation between two input tensors, a pooling or a matrix contraction operation to reduce the size of the input tensor, etc.), as well as element-wise neural network operators that are not included in the SESE subgraphs. On the other hand, computations of different sequences of element-wise neural network operators of SESE subgraphs can be approximated using the merged operator mapping tables.

With the arrangements described above, a neural network hardware accelerator can perform a sequence of element-wise neural network operators by selecting an output value from a merged operator mapping table, instead of performing a sequence of arithmetic operations for the neural network operators. Given that accessing a mapping table to select an output value is typically much faster than performing a sequence of arithmetic operations in arithmetic circuits to compute that output value, while the memory access operations involved to support the sequence of arithmetic operations can also be reduced, the execution of the sequence of neural network operators can be significantly speeded up. Moreover, computation resources can be preserved for execution of reduce-like neural network operators, such as matmul and summation operations. All these can speed up the neural network computations and the applications that rely on the neural network computations.

In some examples, the merged operator mapping tables are dynamically programmable to expand the number of different sequences of element-wise neural network operators that can be approximated by the merged operator mapping tables. For example, prior to the execution of an instruction that refers to a merged operator mapping table, the registers of the merged operator mapping table can be programmed to store a first set of candidate output values. The first set of candidate output values can represent a first piece-wise polynomial that approximates a first sequence of element-wise neural network operators. When the instruction is executed, a first value can be selected from the first set of candidate output values, based on an input value, to represent a result of performing the first sequence of element-wise neural network operators on the input value. The registers of the same merged operator mapping table can then be programmed to store a second set of candidate output values. The second set of candidate output values can represent a second piece-wise polynomial that approximates a second sequence of element-wise neural network operators. When the same instruction is executed again, a second value can be selected from the second set of candidate output values, based on the same input value, to represent a result of performing the second sequence of element-wise neural network operators on the input value.

In some examples, the merged operator mapping tables can be programmed when the computation engine performs the operations and does not require the rebooting of the neural network hardware accelerator. Such arrangements can reduce disruption to the operations of the hardware accelerator caused by the programming. Meanwhile, by reusing the same hardware resources (e.g., registers, multiplexors, etc.) to store different merged operator mapping tables, the hardware resources needed to provide a number of different merged operator mapping tables can be reduced.

In some examples, the instruction decoder and the instruction schema mapping table can also be programmed to map the same opcode to different merged operator mapping tables, and/or to map different opcodes to the same merged operator mapping table at different times, to further improve flexibility and reduce hardware resources needed in the assignment of opcodes to support the number of different merged operator mapping tables.

In some examples, a compiler is provided to generate instructions for a neural network hardware accelerator to support execution of sequences of element-wise neural network operators using merged operator mapping tables. Specifically, the compiler can receive input codes of a neural network that include a set of neural network operators including element-wise neural network operators and reduce-like neural network operators. The compiler can compile the input codes to generate an input data set representing a first dataflow graph of the neural network. The compiler can then traverse the first dataflow graph to identify SESE subgraphs having only element-wise neural network operators. The identification can be based on, for example, a SESE-subgraph-to-merged-operator mapping table that maps different SESE subgraph topologies, each having a pre-defined sequence of element-wise neural network operators, to different merged operators. The compiler can then generate a second dataflow graph based on replacing each identified SESE subgraph in the first dataflow graph with the corresponding merged operator.

The compiler can then generate executable instructions for the second dataflow graph, and a schedule of execution of the executable instructions by the neural network hardware accelerator. The compiler can generate the executable instructions based on, for example, accessing an instruction mapping table that maps the merged operators as well as other neural network operators, including reduce-like operators and element-wise operators not included in the SESE subgraphs, to instructions having opcodes and operands defined based on the instruction schemas. In some examples, each merged operator can be mapped to a single instruction having a single opcode, or a fixed number of instructions having a fixed number of opcodes irrespective of the number of neural network operators represented by the merged operator. The compiler can also generate the schedule of execution based on, for example, data dependencies between the neural network operators, available computation and memory resources at the neural network hardware accelerator, etc. The compiler can then generate an instruction program including the instructions and the schedule of execution, and the instruction program can be provided to the neural network hardware accelerator for execution.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right) \quad \text{(Equation 1)}$$

In the above equation, $W_{ij}$ is a weight, $x_i$ is an input activation, $y_j$ is an output activation, $f(\ )$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Figure 2:
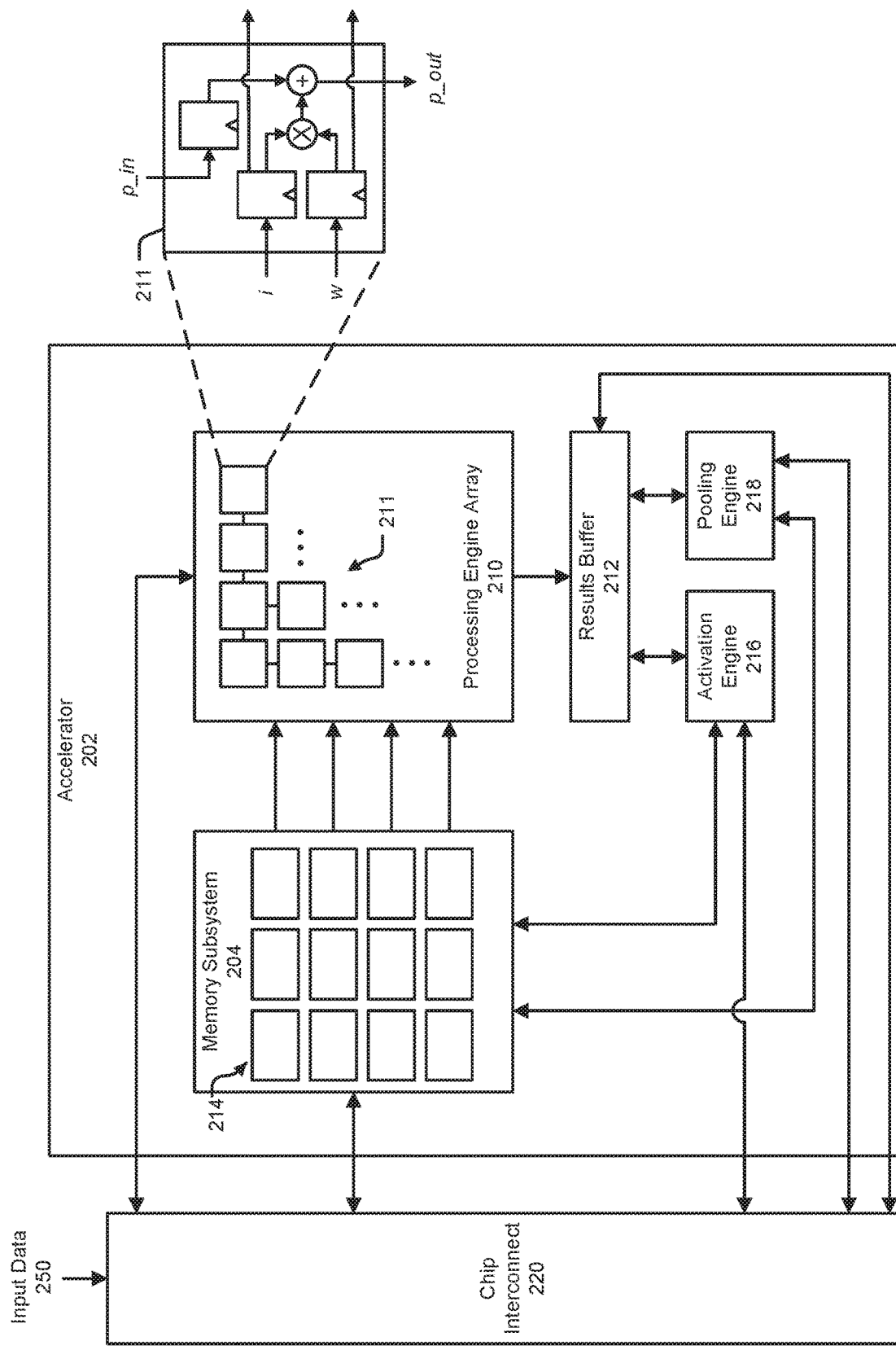
FIG. 2 illustrates an example of an integrated circuit that can be programmed to execute the computational flow model of FIG. 1.

A neural network, such as the neural network represented in FIG. 1, can be in a neural network hardware accelerator to more efficiently execute computations of the neural network. FIG. 2 is a block diagram illustrating an example of an integrated circuit device. The example of FIG. 2 illustrates an accelerator 202. In various examples, the accelerator 202, for a set of input data (e.g., input data 250), can perform computations using a processing engine array 210, an activation engine 216, and/or a pooling engine 218. In some examples, the example accelerator 202 may be an integrated circuit component of a processor, such as a neural network processor. The processor may have other integrated circuit components, including additional accelerator engines. Accelerator 202 may execute a set of instructions that reflects, for example, computational flow model 100 of FIG. 1, to perform the computations.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array 210, with one memory bank servicing each row. As another example, a set of memory banks can be hard wired to receive values from columns of the processing engine array 210, with one memory bank receiving data for each column.

The processing engine array 210 is the computation matrix of the example accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the memory subsystem 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples, weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connects one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, p_in, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214, can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include, for example, computing a maximum value, a minimum value, an average value, a median value, a summation, a multiplication, or another logical or mathematical combination. In various examples, the pooling engine 218 can include multiple execution channels that can operate on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example, one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

Figure 3:
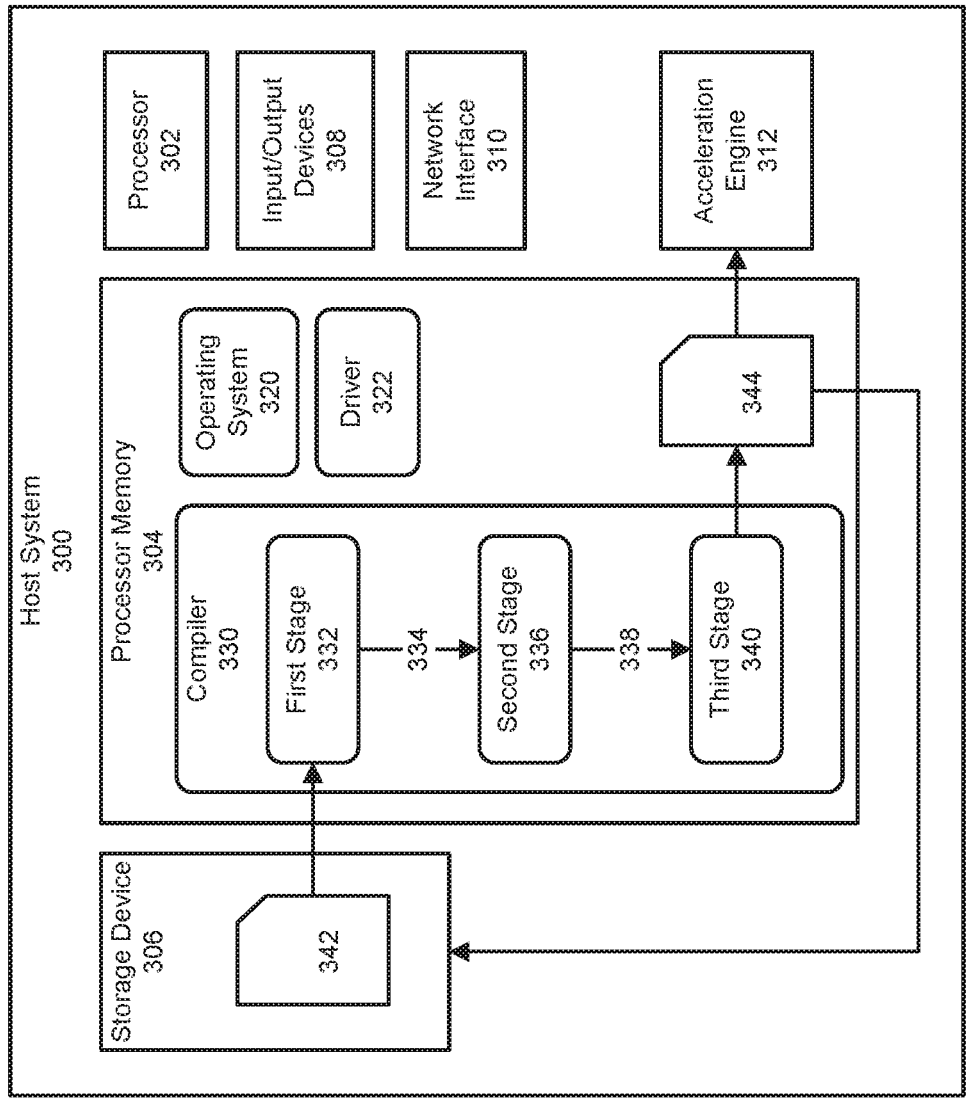
FIG. 3 illustrates an example of a host system that can generate executable instructions to be executed by the integrated circuit of FIG. 2.

As described above, accelerator 202 may execute a set of instructions that reflects, for example, computational flow model 100 of FIG. 1, to perform the computations for a neural network. The set of instructions can be generated by a compiler. FIG. 3 includes a block diagram illustrating an example of a host system 300 on which the compiler can run. The illustrated host system 300 is an example of a computing device, and includes a processor 302, a processor memory 304, at least one storage device 306, various Input/Output (I/O) devices 308, and at least one network interface 310. In the example of FIG. 3, the host system 300 also includes an acceleration engine 312, which is an integrated circuit device that can accelerate certain operations or computations performed by the host system 300. In various examples, the host system 300 can be implemented as a server in a data center, a desktop computer, a laptop computer, a tablet computer, or a smartphone, among other examples. In some examples, operations or components discussed below as performed or included in the host system 300 can be performed or included in other computer devices. For example, the compiler 330 can execute on the host system 300 while the acceleration engine 312 is located at a different host system.

The processor 302 is an integrated circuit device that can execute program code, in the form of instructions. The program code can be used for various software applications or tools, such as an operating system 320 or the illustrated compiler 330. While the processor 302 is executing a program, the instructions for the program can be stored in the processor memory 304. The instructions can also be stored elsewhere, such as on the storage device 306, and can be loaded into the processor memory 304 when needed by the processor 302. The processor 302 can also use the processor memory 304 for temporary storage of other data on which the processor 302 is operating. In various examples, the processor memory 304 is a volatile memory type, such as a type of Random Access Memory, though non-volatile memory types can, alternatively or additionally, be used for the processor memory 304.

The storage device 306 is an example of a device that can include non-volatile memory. For example, the storage device 306 can be a magnetic disk drive, a solid state drive, or an optical drive, among other examples. The storage device 306 can further be non-transitory, such that program code and other data stored on the storage device 306 remains present when the storage device 306 is not powered on.

The storage device 306 is one example of a peripheral device, which are components that can be coupled to the host system 300 to add functionality to the host system 300. Other examples of peripheral devices include the Input/Output devices 308 and the network interface 310. The Input/Output devices 308 can include user input and output devices, such as keyboards, mice, touch screens, microphones, display screens, speakers, printers, and scanners, among other examples. The network interface 310, which can be implemented using a network interface card, can provide access to one or more networks. The network interface 310 can include, for example, a physical port for connecting a network cable and/or wireless antennas for communicating with Wi-Fi and/or cellular networks. The network interface 310 can also be described as an I/O device.

The acceleration engine 312 is also another type of peripheral device or I/O device. The acceleration engine 312 is a device that is purpose built to perform certain operations that can be performed by the processor 302, but can be performed faster by the acceleration engine 312. For example, the acceleration engine 312 can be a neural network accelerator, and, as such, may be able to perform the large scale, parallel computations of a neural network more efficiently than when the computations are performed by the processor 302. As another example, the acceleration engine 312 can be a GPU, and may be optimized to perform the computations needed for graphics rendering. Other examples of devices that can be implemented by the acceleration engine 312 include cryptographic accelerators, compression and decompression accelerators, 3-D accelerators, regular expression accelerators, security accelerators, and others.

In various examples, the acceleration engine 312 can execute program code to perform certain operations. For example, when the acceleration engine 312 is a neural network accelerator, the acceleration engine 312 can be programmed to execute a particular neural network, such as one that performs image recognition or one that performs machine translation. As a further example, to support the execution of a neural network, the acceleration engine 312 can be programed to perform operations such as copying data for the neural network from processor memory 304 (for example) into the acceleration engine 312, copying input data for the neural network from processor memory 304 into the acceleration engine 312, and/or copying results from the acceleration engine 312 into the processor memory 304, among other examples.

To generate program code for the acceleration engine 312, in various examples, the host system 300 can execute the compiler 330. Compilers, in general, are software programs that translate program code written in a human-readable language into a format (e.g., machine instructions) that can be read and processed by an integrated circuit device. In the example of FIG. 3, the acceleration engine 312 is a neural network accelerator and the compiler 330 is for compiling a neural network description into instructions to be executed on the acceleration engine 312. When the acceleration engine 312 implements a different type of accelerator, another compiler can be used.

The compiler 330 can be activated, for example, when the operating system 320 receives keyboard, mouse, touchscreen, voice commands, or other inputs from the Input/Output devices 308. The inputs can further include parameters for the compiler 330, such as the input code 342 to compile and configure options for the compilation process. Once the compiler 330 is activated, the processor 302 can load the instructions for the compiler 330 into the processor memory 304, and can execute the instructions.

In the example of FIG. 3, the compiler 330 includes a first stage 332, a second stage 336, and a third stage 340, which each perform different operations to produce compiled code 344. In other examples, the compiler 330 can combine the operations of the first stage 332, second stage 336, and/or third stage 340 into fewer stages, or can divide the operations of one of the stages into multiple stages.

The first stage 332 can receive and process input code 342. The input code 342 can describe a program in a high-level programming language, such as Java, C++, or Tensorflow, among many other examples. The input code 342 can describe, for example, steps to perform image recognition, speech recognition, machine translation, or other operations. The input code 342 can be obtained, for example, from the storage device 306. Alternatively, though not illustrated here, the input code 342 may be located in the processor memory 304 or can be obtained from a network location, using the network interface 310. Processing of the input code 342 can include sorting the operations described in the input code 342 into layers, where the outputs of one layer provide the inputs to a next layer. Processing can also include identifying steps to be performed by the processor 302, rather than by the acceleration engine 312. For example, the processor 302, through the execution of a driver 322, may need to perform steps such as configuring Direct Memory Access (DMA) descriptors for moving data into or out of the acceleration engine 312, among other examples.

The output 334 of the first stage 332 can be organized, for example, in the layers, nodes, and connections between nodes of a neural network. The second stage 336 can perform intermediate processing on this output 334. For example, the operations performed in any one layer, or at any one node in a layer, may be too many for the acceleration engine 312 to perform at the same time. The acceleration engine 312 may, for example, have a limited amount of local storage space for the data needed for a computation, or the computations may be more than the acceleration engine 312 can perform at one time. In this example, the first stage 332 can break the operations of the layer or node down into smaller operations, which can fit into the acceleration engine's local memory and/or can fit into the computing capacity of the acceleration engine 312. Processing of the output 334 of the first stage 332 can include other steps, such as scheduling, or determining the order in which the acceleration engine 312 and/or processor 302 will perform operations, among other examples.

In various examples, the output 338 of the second stage 336 includes the various steps to be performed by components of the acceleration engine 312, in the order that the steps are to be performed. The output 338 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 340 can operate on the output 338 of the second stage 336, and perform various steps before producing the instructions that are to be executed by the acceleration engine 312. These steps can include, for example, removing redundant dependencies, resolving or handling dependencies between nodes by inserting synchronization instructions into the code, identifying possible optimizations in memory footprint or memory bandwidth usage, and other operations.

The output of the third stage 340 is compiled code 344, which may include machine instructions in binary format. In some examples, the compiled code 344 can be stored in the processor memory 304. Alternatively or additionally, the compiled code 344 can be copied to the storage device 306 or to a network location. As noted above, the acceleration engine 312 may be located at a different host system, in which case the compiled code 344 can be sent over the network interface 310 to the other host system.

In the example of FIG. 3, the host system 300 can execute a driver 322, which can also be referred to as a device driver or runtime driver, that manages the acceleration engine 312. The driver 322 can provide an interface between applications executing on the host system 300 (or on another host system) and the acceleration engine 312. For example, the driver 322 can provide an Application Program Interface (API) that defines functions for feeding input data to the acceleration engine 312 and defining the operation to perform on the input data. In this and other examples, the driver 322 can configure the acceleration engine 312 to perform the operation. For example, the driver 322 can identify a neural network that the acceleration engine 312 is to execute, as well as the location in the processor memory 304 or on the storage device 306 where the compiled code 344 for the neural network is located. The driver 322 can further load into the acceleration engine 312 or cause the acceleration engine 312 to load the compiled code 344, can load or cause the acceleration engine 312 to load the input data on which the neural network is to operate, and/or can cause the acceleration engine 312 to begin executing on the input data. Once the acceleration engine 312 has finished, the acceleration engine 312 can notify the driver 322, and the driver 322 can deliver a result back to the application that requested the result.

Figure 4A:
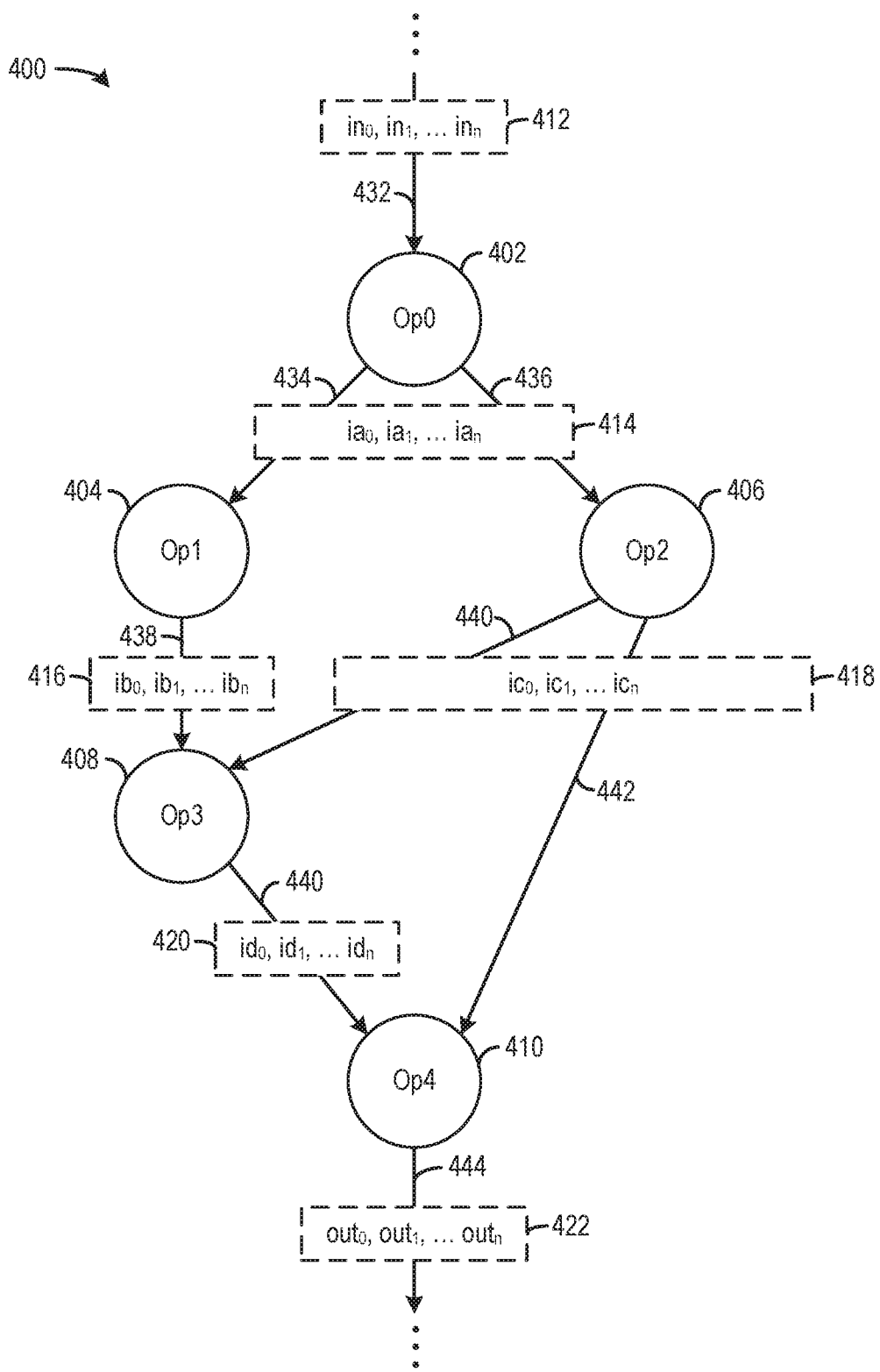
FIG. 4A, FIG. 4B, and FIG. 4C illustrate examples of a dataflow graph of a neural network model and an execution sequence of the dataflow graph.

FIG. 4A illustrates an example of a computational dataflow graph 400. In some examples, graph 400 can be part of a neural network dataflow graph for a neural network. Graph 400 can be an intermediate output of compiler 330, such as output 338 of FIG. 3. Graph 400 can include multiple nodes each representing an operator (e.g., a neural network operator), such as node 402 (representing operator "Op0"), node 404 (representing operator "Op1"), node 406 (representing operator "Op2"), node 408 (representing operator "Op3"), and node 410 (representing operator "Op4"). Each operator can receive one or more input tensors, perform an operation on the one or more input tensors, and generate an output tensor. For example, operator Op0 (node 402) receives an input tensor 412 ($in_0$, $in_1$, . . . $in_n$) to graph 400, and generates an intermediate output tensor 414 ($ia_0$, $ia_1$, . . . $ia_n$) as an output. Each of operators Op1 (node 404) and Op2 (node 406) receives intermediate output tensor 414 as an input and generates, respectively, an intermediate output tensor 416 ($ib_0$, $ib_1$, . . . $ib_n$) and an intermediate output tensor 418 ($ic_0$, $ic_1$, . . . $ic_n$). Operator Op3 (node 408) receives intermediate output tensors 416 and 418 as inputs and generates an intermediate output tensor 420 ($id_0$, $id_1$, . . . $id_n$). Moreover, operator Op4 (node 410) receives intermediate output tensors 418 and 420 as inputs and generates an output tensor 422 ($out_0$, $out_1$, . . . $out_n$) for graph 400.

Moreover, the nodes are interconnected by directional edges (represented by arrows in FIG. 4A) which indicate the flow of data between the nodes as described above. For example, node 402 is connected to another node (not shown in FIG. 4A) via an edge 432 and receives input tensor 412 via edge 432. Nodes 404 and 406 are connected to node 402 via edges 434 and 436 and receive intermediate output tensor 414 via those edges. Node 408 is connected to nodes 404 and 406 via edges 438 and 440 and receives intermediate output tensors 416 and 418 via those edges. Node 410 is connected to nodes 408 and 406 via edges 440 and 442 and receives intermediate outputs 420 and 418 via those edges. Node 410 is further connected to another node (not shown in FIG. 4A) via an edge 444 and outputs output tensor 422 to the other node via edge 444.

Figure 4B:
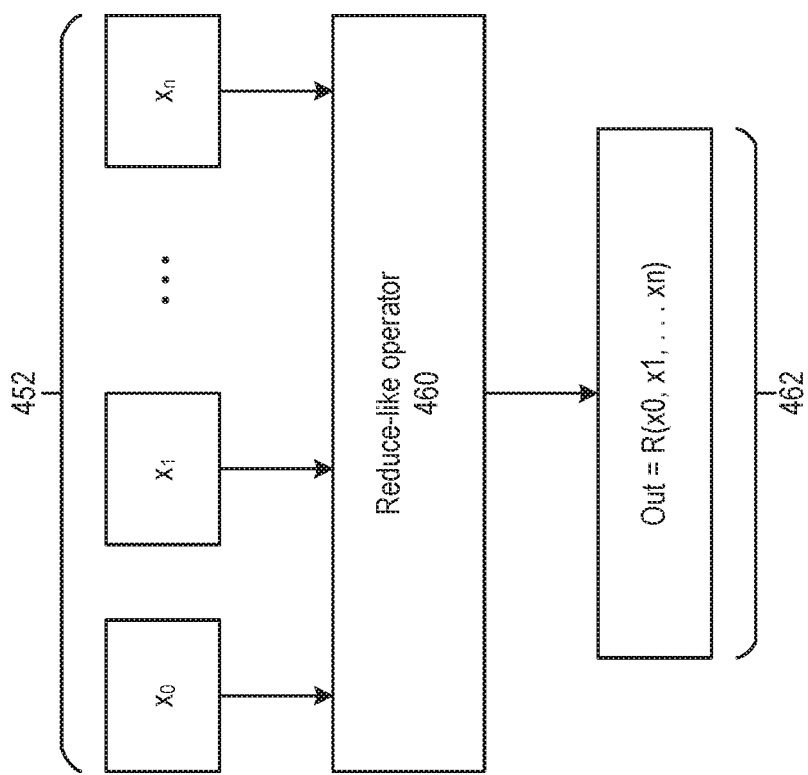
Figure 4B:
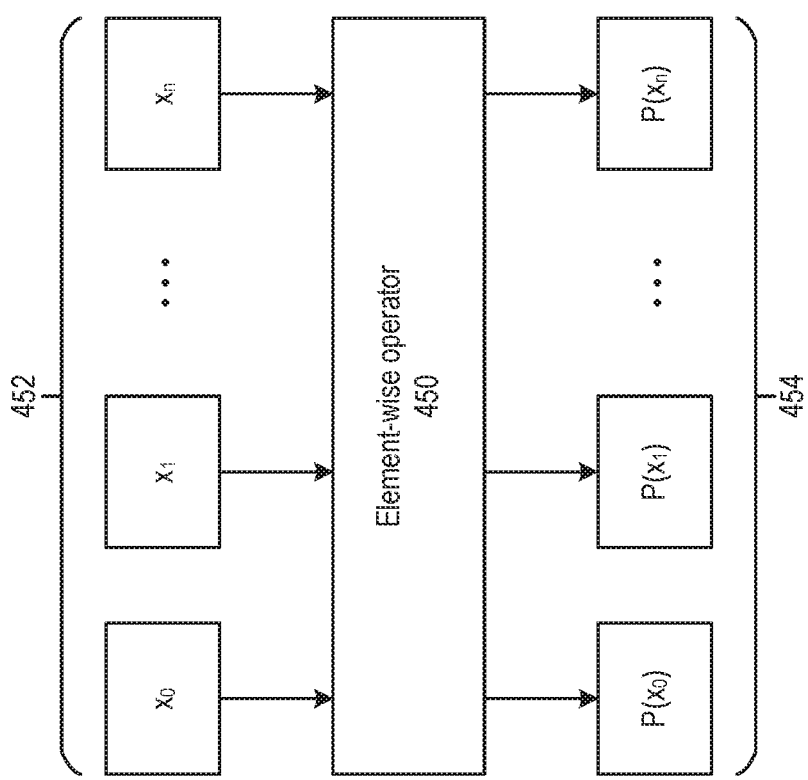

Computational dataflow graph 400 can include different types of operators, such as element-wise operators and reduce-like operators. FIG. 4B illustrates examples of operations of an element-wise operator and a reduce-like operator. As shown in FIG. 4B, an element-wise operator 450 can receive an input tensor 452 including data elements $x_0$, $x_1$, ... $x_n$, apply the same function P to each data element, and generate an output tensor 454 including data elements $P(x_0)$, $P(x_1)$, ... $P(x_n)$. Examples of element-wise operator can include, for example, passing the data element to a function (e.g., the activation function f( ) of Equation 1, or other functions), adding a constant (e.g., the bias term b of Equation 1), multiplying the data element with a constant, adding or multiplying two corresponding data elements in two tensors having the same dimensions, etc. On the other hand, reduce-like operator 460 may apply different operations to different data elements of input tensor 452 to generate output tensor 462. Examples of reduce-like operator can include summation of matrix multiplication (e.g., matmul) between two input tensors, a convolution operation between two input tensors (e.g., conv2d), a pooling operation (e.g., average pooling (avgpool), max pooling (maxpool), a matrix contract operation (e.g., reduce_sum that sums elements of a tensor along a particular dimension)), etc.

The neural network operators shown in FIG. 4A can be executed by various components of accelerator 202 of FIG. 2, such as processing engine array 210, results buffer 212, activation engine 216, and pooling engine 218. A sequence of neural network operators, such as operators Op0, Op1, Op3, and Op4, is typically executed sequentially in accelerator 202, given the data dependency between the operators. Moreover, the execution of each operator may also involve fetching of data to and from an on-chip memory, such as memory subsystem 204. All these can add to the total completion time of the neural network computations.

Figure 4C:
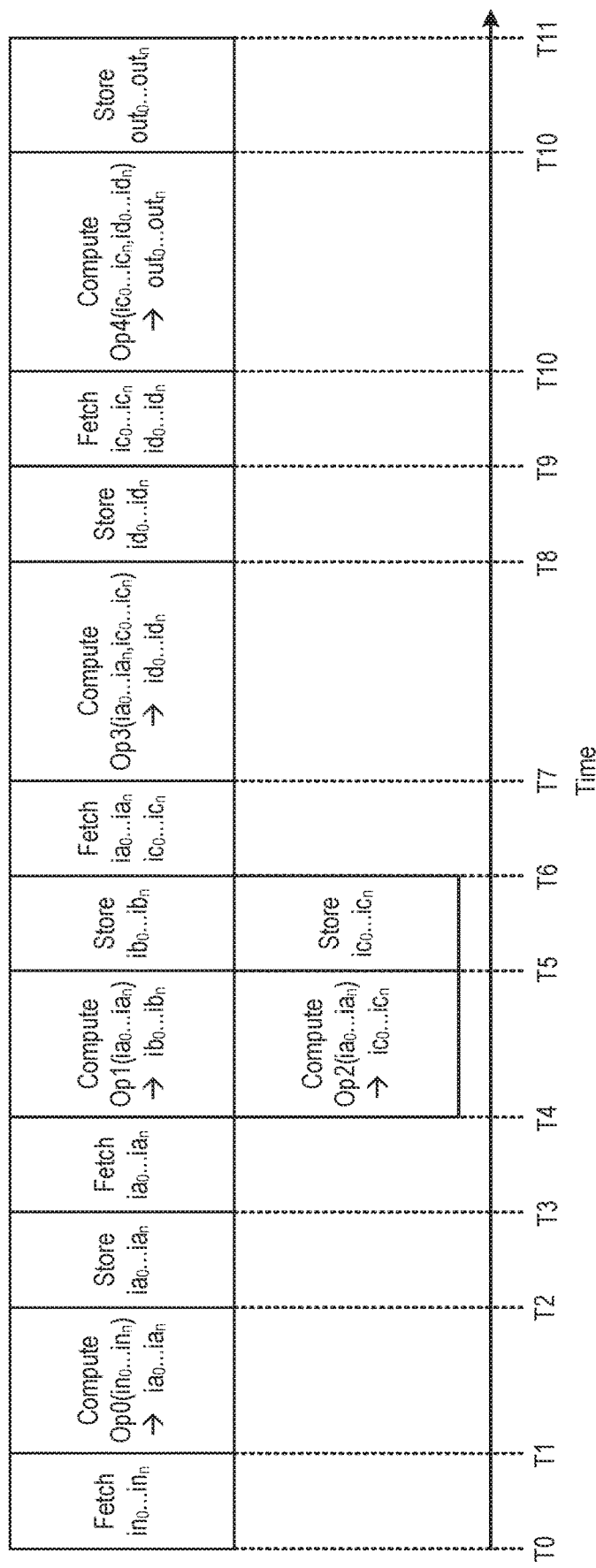

FIG. 4C illustrates an example timing diagram 470 of the execution of the operators of FIG. 4A. As shown in FIG. 4C, between times T0 and T1 input tensor 412 ($in_0$, $in_1$, ... $in_n$) is fetched from memory subsystem 204 to, for example, processing engine array 210. Operator Op0 can be executed by processing engine array 210 between times T1 and T2 on input tensor 412 to generate intermediate output tensor 414 ($ia_0$, $ia_1$, ... $ia_n$), which can be stored back to memory subsystem 204 between times T2 and T3. Intermediate output tensor 414 can be fetched from memory subsystem 204 to processing engine array 210 between times T3 and T4. Operators Op1 and Op2 can be executed by processing engine array 210 in parallel between times T4 and T5 to generate intermediate output tensor 416 ($ib_0$, $ib_1$, ... $ib_n$) and intermediate output tensor 418 ($ic_0$, $ic_1$, ... $ic_n$). Both intermediate output tensors 416 and 418 are stored back to memory subsystem 204 between times T5 and T6. Intermediate output tensors 414 and 418 are then fetched from memory subsystem 204 to processing engine array 210 between times T6 and T7. Operator Op3 can be executed by processing engine array 210 on intermediate output tensors 414 and 418 to generate intermediate output tensor 420 ($id_0$, $id_1$, ... $id_n$), which can be stored back to memory subsystem 204 between times T8 and T9. Between times T9 and T10, intermediate output tensors 418 and 420 are fetched from memory subsystem 204. Operator Op4 can then be executed on intermediate output tensors 418 and 420 to generate output tensor 422. As shown in FIG. 4C, due to data dependencies, operator Op0 is executed first, followed by operators Op1 and Op2, which are then followed by operator Op3 and then operator Op4. Due to the sequential execution of the operators, it takes a duration between times T0 to T11 to complete the neural network computations for dataflow graph 400.

To reduce the time of computations, in some examples, a single-entry-single-exit graph (SESE) comprising a sequence of element-wise operators can be replaced with a merged operator. The SESE graph can receive a single input tensor and output a single output tensor. If the SESE graph comprises only element-wise operators, a one-to-one relationship can be established between each corresponding data element (e.g., data elements having the same coordinates) of the single input tensor and of the single output tensor. The merged operator can represent the one-to-one relationship.

Figure 5A:
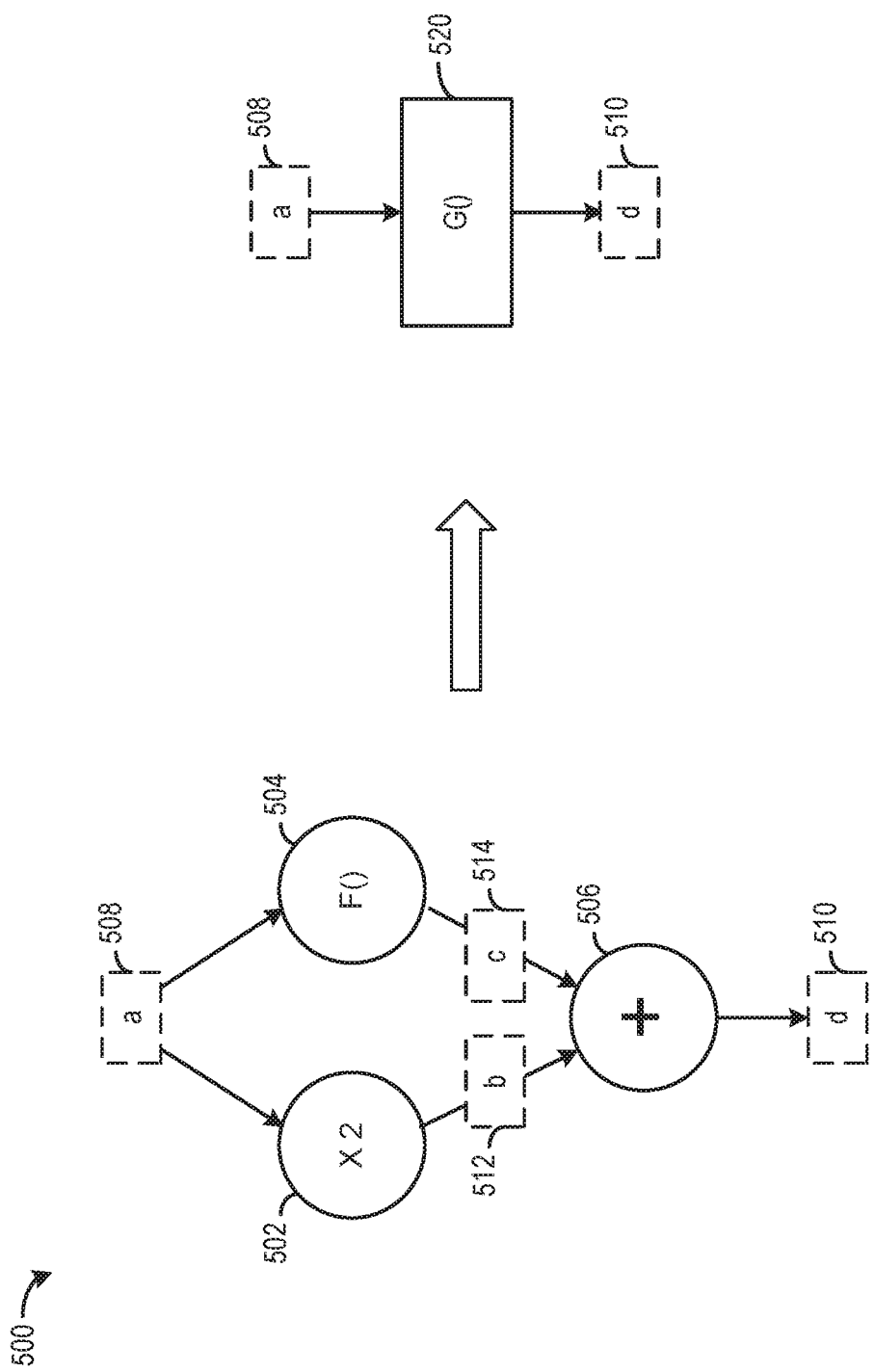
FIG. 5A, FIG. 5B, and FIG. 5C illustrate examples of generating a merged operator in a dataflow graph and an execution sequence of the merged operator.

FIG. 5A illustrates an example of a SESE graph including a sequence of element-wise operators. As shown on the left of FIG. 5A, a graph 500 includes nodes 502, 504, and 506 each representing an element-wise operator. Graph 500 can receive an input tensor 508 (labeled a) and generate an output tensor 510 (labeled d). The operator of node 502 can multiply each data element of input tensor 508 by the constant "2" to generate a corresponding data element of intermediate output tensor 512, whereas the operator of node 504 can input each data element of input tensor 508 to a function to generate a corresponding data element of intermediate output tensor 514. Both intermediate output tensors 512 and 514 have the same dimensions as input tensor 508. The operator of node 506 can sum intermediate output tensors 512 and 514 to generate output tensor 510, where each data element of output tensor 510 is generated based on summing two corresponding data elements of intermediate output tensors 512 and 514. Each data element of output tensor 510 $d_i$ associated with the index i can be related to a corresponding data element $a_i$ of input tensor 508 as follows:

$$d_i = a_i \times 2 + F(a_i) \quad \text{(Equation 2)}$$

As shown in Equation 2, there is a one-to-one correspondence between the data elements of output tensor 510 $d_i$ and the data elements $a_i$ of input tensor 508. As such, the relationship between $d_i$ and $a_i$ can be represented by a function G, as follows:

$$d_i = G(a_i) \quad \text{(Equation 3)}$$

Function G can represent a merged operator 520 that merges the sequence of operators represented by nodes 502, 504, and 506.

The following table provides additional examples of neural network computations that can be represented by a SESE graph comprising only element-wise operators and their merged operators:

TABLE 1

| Neural network computations | Merged operator |
| --- | --- |
| $d_i = \log(\exp(a_i) + 1)$ | $d_i = \text{softplus}(a_i)$ |
| $d_i = a_i \times \tanh(\text{softplus}(a_i))$ | $d_i = \text{mish}(a_i)$ |
| $d_i = 0.5 \times a_i \times (1 + \text{erf}(a_i \times c0))$ | $d_i = \text{gelu}(a_i)$ |

Figure 5B:
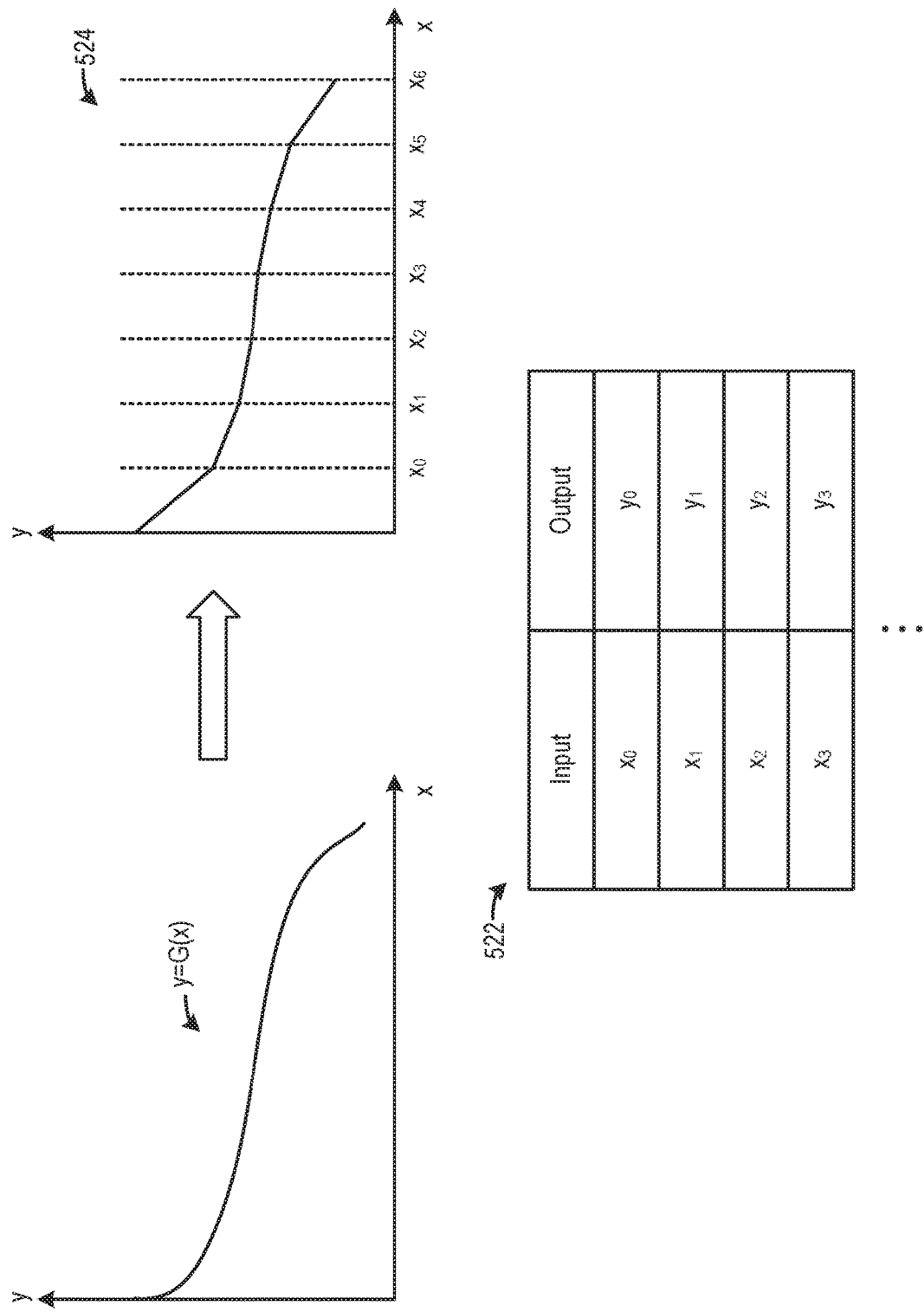

Each of these functions—G( ) of Equation 1 and softplus( ), mish( ), and gelu( ) of Table 1—can be represented by a merged operator mapping table that maps discrete candidate input values to discrete candidate output values. FIG. 5B illustrates an example of a merged operator mapping table 522. As shown in FIG. 5B, the mapping provided by merged operator mapping table 522 can provide a piece-wise polynomial approximation 524 of the function G. Each discrete input value can be a quantized version of the actual input to the function. The actual input value can be quantized (e.g., by removing a certain number of least significant bits), and the quantized input value can be compared with the discrete candidate input values in the mapping table. The candidate output value of the matching candidate input value can then be selected as the output.

Figure 5C:
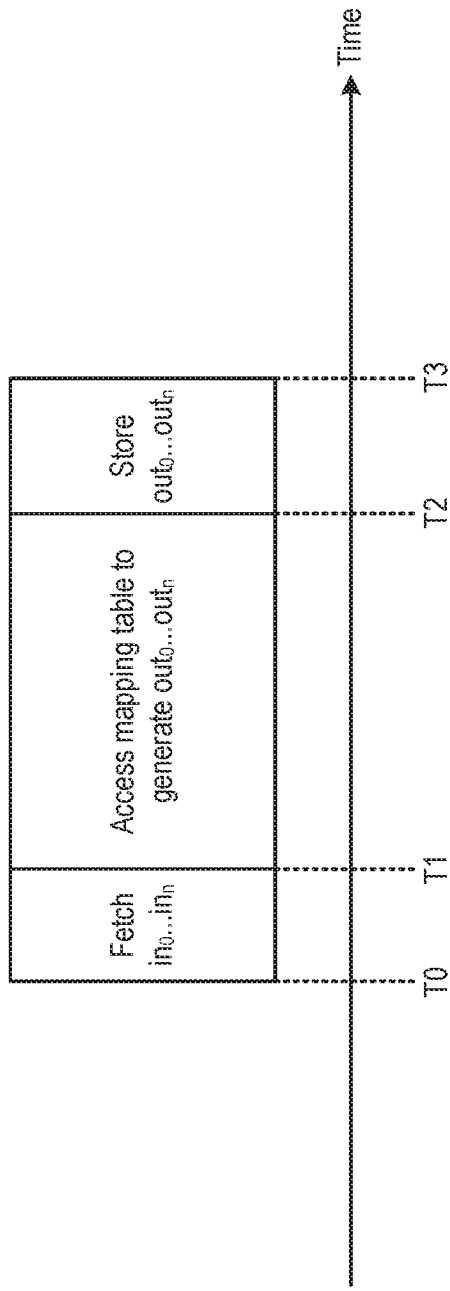

Compared with performing a sequence of arithmetic operations, using a mapping table to generate an output from an input can substantially reduce the computation time. FIG. 5C illustrates an example of a timing diagram 570 for using a merged operator mapping table to generate an output tensor from an input tensor, and to approximate the sequence of operators of dataflow graph 400 of FIG. 4A. Assuming that the sequence of operators of dataflow graph 400 of FIG. 4A can be represented by a mapping table, one merged operator mapping table can be accessed for each input data element to obtain each output data element, which is considerably faster than performing a sequence of arithmetic operations, represented by operators Op0 to Op4 on each input data element, to compute an output data element. Moreover, memory subsystem 204 can be accessed twice (between times T0 and T1 and between times T2 and T3) to fetch the input data elements to the mapping table, to store the output data elements output by the mapping table, whereas in FIG. 4C, the memory subsystem may be accessed before and after the execution of each operator. All these can reduce the total computation time needed to generate the output tensor from the input tensor of dataflow graph 400.

In some examples, to reduce the total computation time for a neural network, a compiler, such as compiler 330 of FIG. 3, can identify SESE subgraphs having only element-wise operators from a neural network dataflow graph, and translate the SESE subgraphs to instructions that access merge operator mapping tables on a neural network hardware accelerator. Operators that are not part of the SESE subgraphs can be translated to instructions that are executed using other computation resources (e.g., arithmetic circuits, other mapping tables, etc.) of the neural network hardware accelerator.

Figure 6A:
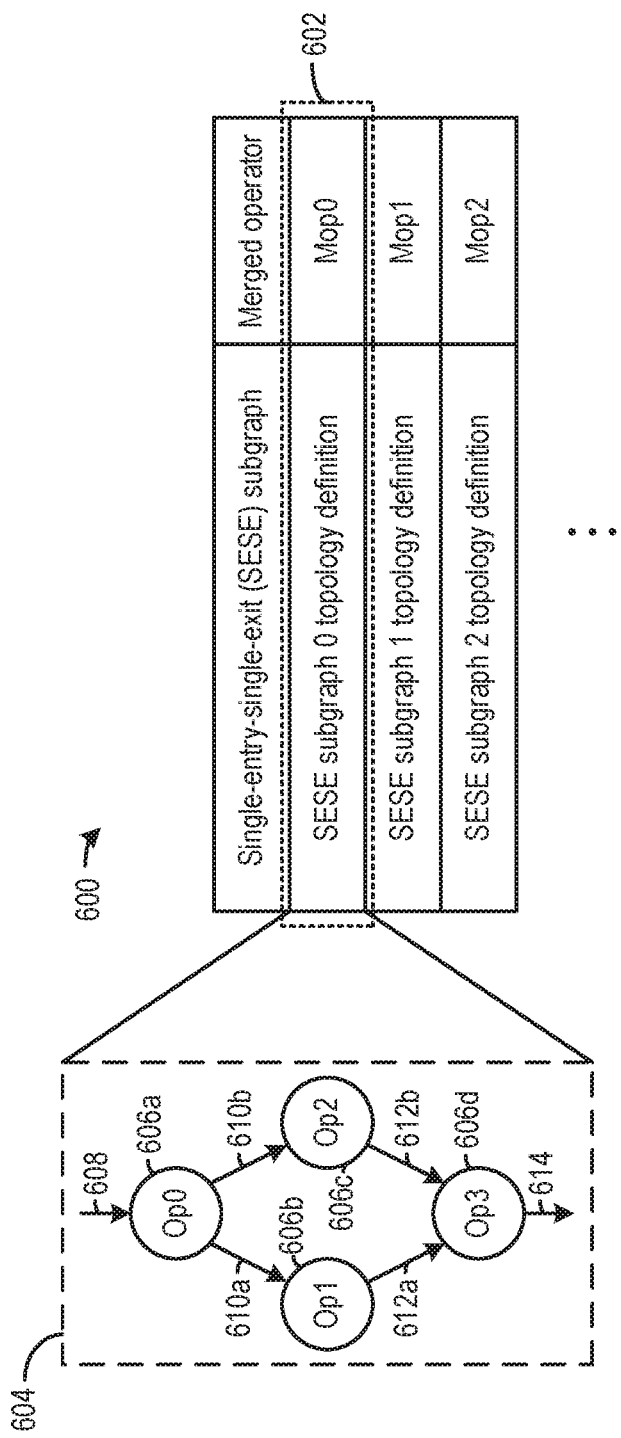
FIG. 6A, FIG. 6B, FIG. 6C, FIG. 6D, and FIG. 6E illustrate examples of operations of a compiler in generating instructions based on replacing subgraphs with merged operators.

FIG. 6A, FIG. 6B, FIG. 6C, FIG. 6D, and FIG. 6E illustrate examples of operations of a compiler in generating instructions based on identifying SESE subgraphs having only element-wise operators and replacing the subgraphs with merged operators. Referring to FIG. 6A, a compiler (e.g., compiler 330) can maintain a SESE-subgraph-to-merged-operator mapping table 600 that maps different SESE subgraphs to different merged operators. Each SESE-subgraph-to-merged-operator mapping table 600 can be represented by a topology definition that lists the element-wise operators included in the SESE subgraph, the edges between nodes of the element-wise operators that represent the dataflow direction, and data dependencies between the element-wise operators. For example, SESE-subgraph-to-merged-operator mapping table 600 can include a mapping 602 between a topology definition 604 of a SESE subgraph (labelled subgraph 0) and a merged operator Mop0. Topology definition 604 can include a node 606a associated with operator Op0, a node 606b associated with operator Op1, a node 606c associated with operator Op2, and a node 606d associated with operator Op3. Topology definition 604 further includes an edge 608 that represents flow of input data into node 606a (operator Op0), edges 610a and 610b that connect node 606a (operator Op0) to nodes 606b and 606c (operators Op1 and Op2), edges 612a and 612b that connect nodes 606b and 606c (operators Op1 and Op2) to node 606d (operator Op3), and an edge 614 that represents the flow of output data from node 606d (operator Op3). Merged operator Mop0 can represent a piece-wise polynomial approximation of a relationship between the inputs and outputs of SESE subgraph 0. SESE-subgraph-to-merged-operator mapping table 600 further includes mapping between topology definitions of other SESE subgraphs (e.g., SESE subgraph 1, SESE subgraph 2, etc.) and other merged operators (e.g., Mop1, Mop2).

Figure 6B:
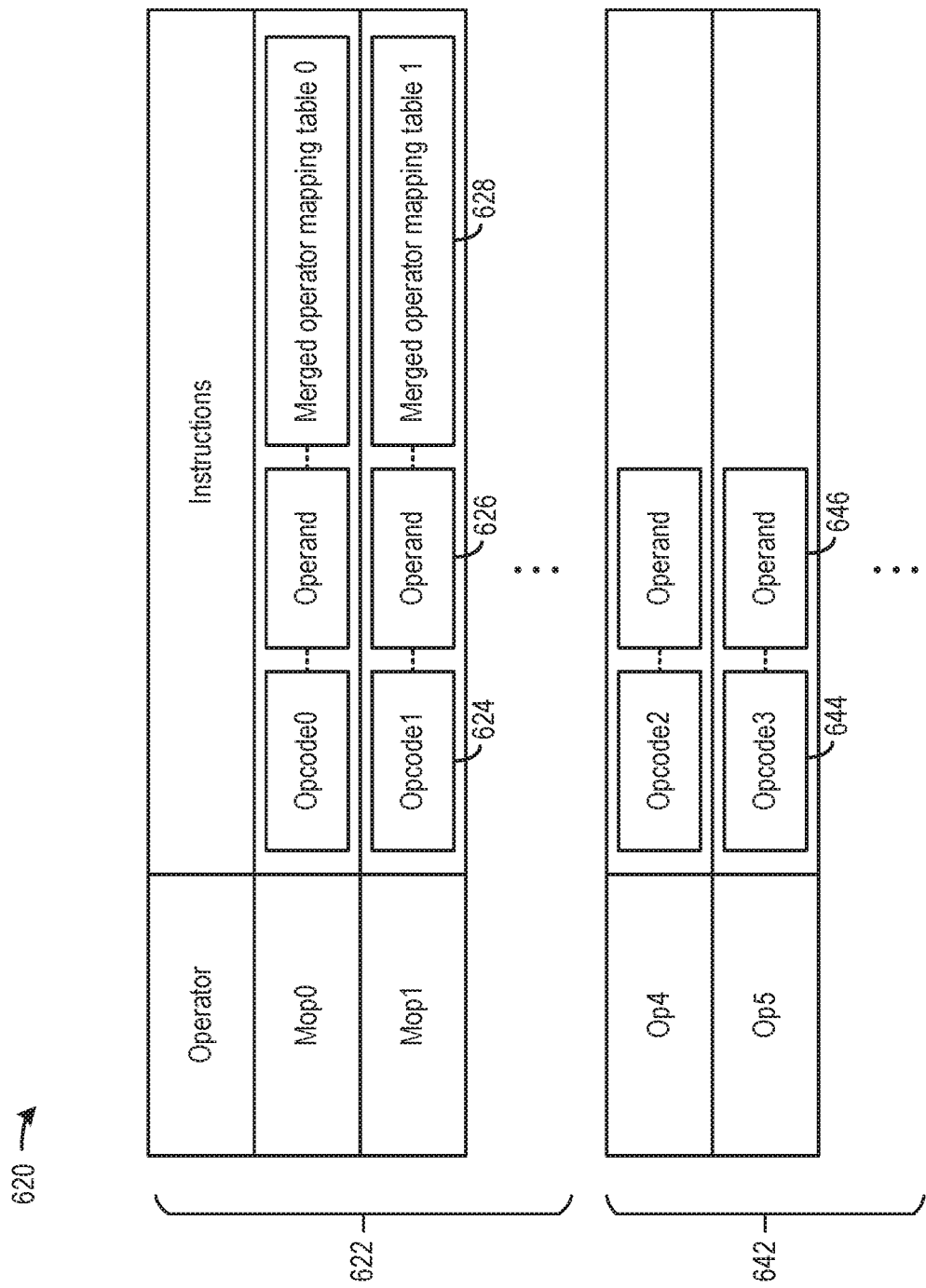

In addition, referring to FIG. 6B, the compiler can also maintain an instruction mapping table 620 that maps different operators to different instructions that can be executed by the neural network hardware accelerator. For example, instruction mapping table 620 includes a section 622 that maps different merged operators (e.g., Mop0, Mop1, etc.) to different instructions. An instruction for a merged operator may include an opcode 624 (e.g., opcode0, opcode1, etc.), an operand 626, and an identifier parameter 628 of a merged operator mapping table (e.g., merged operator mapping tables 0, 1, etc.). In addition, instruction mapping table 620 also includes a section 642 that maps different neural network operators to different instructions that are to be executed using components of the neural network hardware accelerator other than a merged operator mapping table. For example, instructions in section 642 can be executed in processing engine array 210, activation engine 216, and/or pooling engine 218 of accelerator 202. An instruction in section 640 can include an opcode 644 (e.g., opcode2, opcode3, etc.) and an operand 646, but not an identifier of a merged operator mapping table. Instructions in section 640 can be for reduce-like operators (e.g., matmul, conv2d, pooling, etc.) and element-wise operators (e.g., addition, summation, activation function processing, etc.).

To generate the instructions for a computational dataflow graph, such as a neural network dataflow graph, the compiler can first traverse the computational dataflow graph to identify SESE subgraphs having only element-wise operators based on SESE-subgraph-to-merged-operator mapping table 600 and replace the identified SESE subgraphs with merged operators. The compiler can then traverse the computational dataflow graph having the merged operators again and generate the instructions for the merged operators as well as other operators based on instruction mapping table 620. The compiler can also generate a schedule of execution of the instructions based on the data dependencies between the operators (e.g., merged operators, other neural network operators, etc.).

Figure 6C:
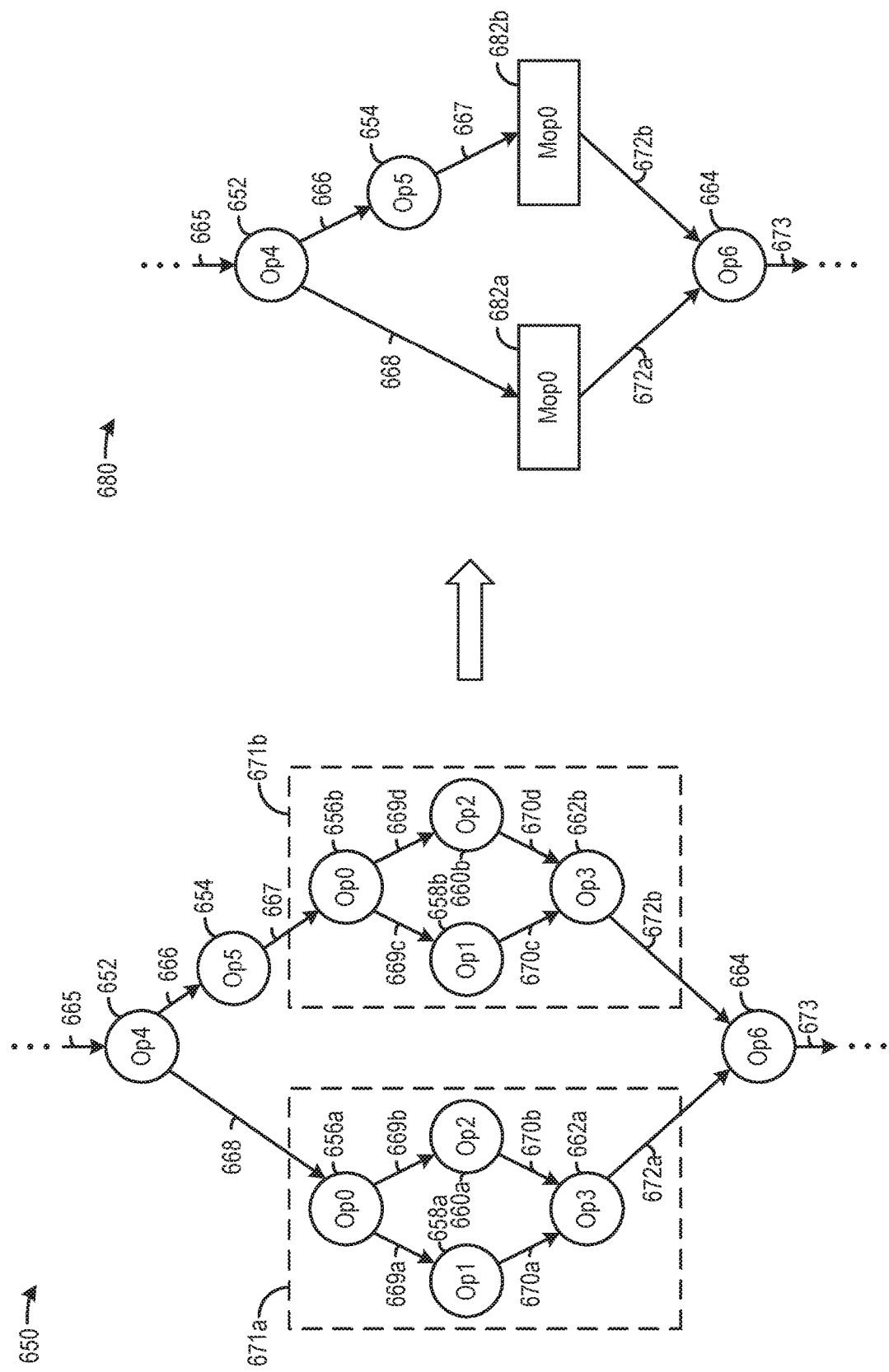

FIG. 6C illustrates an example of operations of the compiler in identifying and replacing SESE subgraphs in a computational dataflow graph. As shown in FIG. 6C, a computational dataflow graph 650 may include a node 652 associated with operator Op4, a node 654 associated with operator Op5, nodes 656a and 656b associated with operator Op0, nodes 658a and 658b associated with operator Op1, nodes 660a and 660b associated with operator Op2, nodes 662a and 662b associated with operator Op3, and a node 664 associated with operator Op6. Computational graph 650 further includes an edge 665 that represents flow of input data into node 652 (operator Op4), an edge 666 that connects node 652 (operator Op4) to node 654 (operator Op5), an edge 667 that connects node 654 (operator Op5) to node 656b (operator Op0), and an edge 668 that connects node 652 (operator Op4) to node 656a (operator Op0).

In addition, nodes 656a (operator Op0), 658a (operator Op1), 660a (operator Op2), and 662a (operator Op3), together with edges 669a, 669b, 670a, and 670b, form a SESE subgraph 671a. Further, nodes 656b (operator Op0), 658b (operator Op1), 660b (operator Op2), and 662b (operator Op3), together with edges 669c, 669d, 670c, and 670d, form a SESE subgraph 671b. Node 656a (operator Op0) of SESE subgraph 671a receives edge 668 as input, whereas node 656b (operator Op0) of SESE subgraph 671b receives edge 667 as input. In each of SESE subgraphs 671a and 671b, operators Op1 and Op2 receive inputs from operator Op0 and provide outputs to operator Op3. The outputs of SESE subgraphs 671a and 671b, generated by nodes 662a and 662b (operator Op3), are connected to node 664 (operator Op6) via edges 672a and 672b. Node 664 is connected to an edge 673 to represent flow of output data from node 664.

To generate instructions for computational dataflow graph 650, the compiler can traverse computational dataflow graph 650 to identify subgraphs having the same topology as the SESE subgraphs listed in SESE-subgraph-to-merged-operator mapping table 600, and replace the identified subgraphs in computational dataflow graph 650 with the merged operators from SESE-subgraph-to-merged-operator mapping table 600 to generate a new computational dataflow graph. A subgraph has the same topology as a SESE subgraph listed in SESE-subgraph-to-merged-operator mapping table 600 if the two subgraphs have the same set of operators, and the operators of the two subgraphs have the same edge connectivity. In the example of FIG. 6C, the compiler may determine that subgraph 671a and subgraph 671b have the same set of operators (Op0, Op1, Op2, and Op3), and the same edge connectivity (edges connect from operators Op0 to operators Op1 and Op2, and edges connect from operators Op1 and Op2 to operator Op3) as SESE subgraph 604 of FIG. 6A, and replace subgraphs 671a and 671b with nodes 682a and 682b representing merged operator Mop0, to generate a network dataflow graph 680.

In computational dataflow graph 680, edges 665, 666, 667, 668, 672a, and 672b, as well as nodes 652, 654, and 664 are retained. Node 652 (operator Op4) receives input data via edge 665. Node 682a (merged operator Mop0) receives edge 668 as an input, and node 682b (merged operator Mop0) receives edge 667 as an input. Further, the outputs of nodes 682a and 682b are connected to node 664 (operator Op6), which is connected to an edge 673 to represent flow of output data from node 664.

Figure 6D:
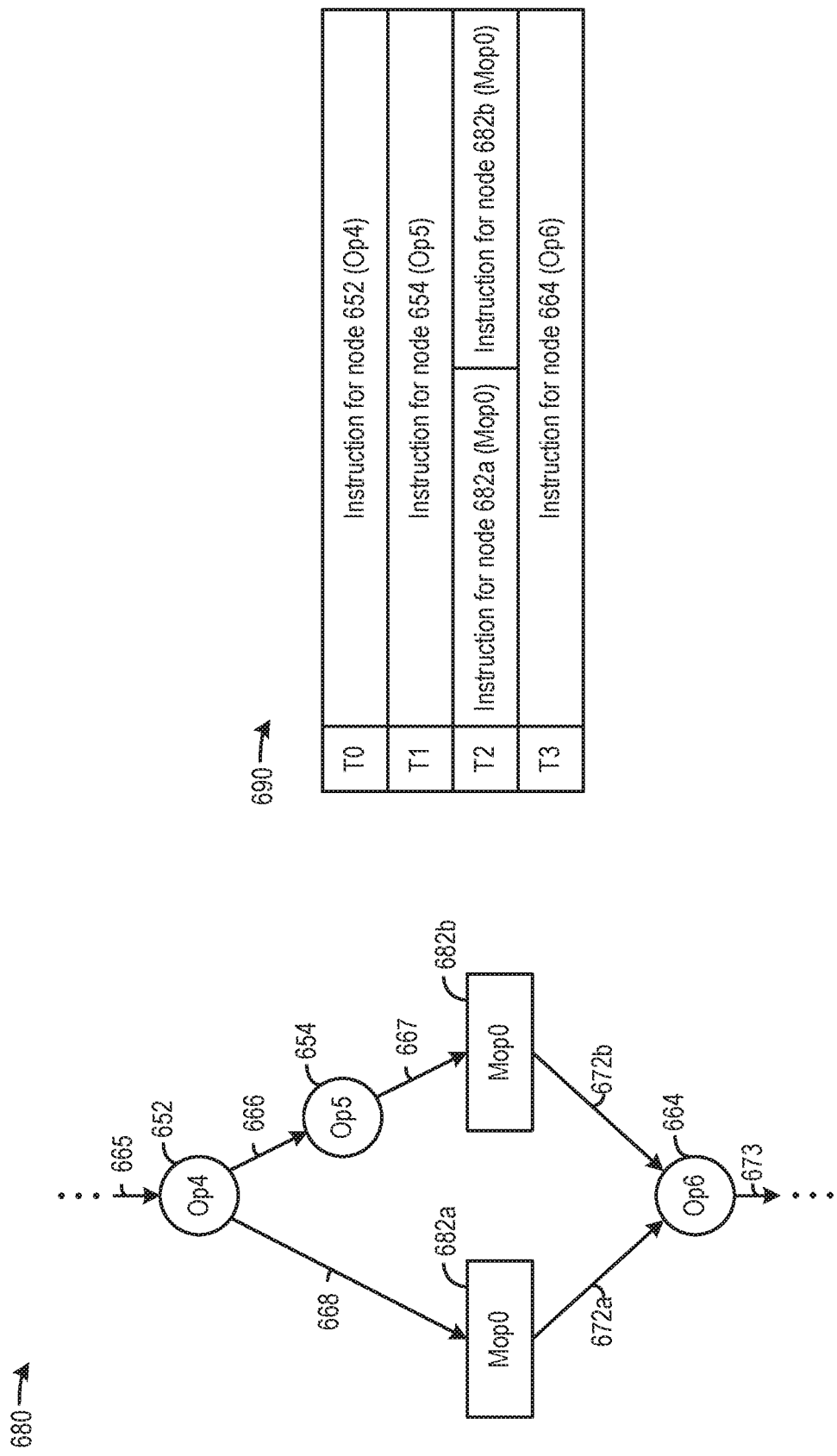

FIG. 6D illustrates an example of program 690. After generating computational dataflow graph 680, the compiler can traverse computational dataflow graph 680 to generate a program 690 of instructions, which can also include a schedule of execution of the instructions. Specifically, the compiler can refer to instruction mapping table 620 of FIG. 6B and translate each operator in computational dataflow graph 680, including operators Op4, Op5, Op6, and merged operator Mop0, into instructions for nodes 652 (Op4), 654 (Op5), 682a (Mop0), 682b (Mop0), and 664 (Op6). The compiler can also determine the schedule of execution based on the data dependencies between the nodes reflected in the edge direction. As shown in FIG. 6D, program 690 can indicate that instruction for node 652 (Op4) is to be executed at time T0, followed by instruction for node 654 (Op5) at time T1, followed by instructions for nodes 682a and 682b (Mop0) at time T2, and followed by instruction for node 664 (Op6) at time T3. The instructions for nodes 682a and 682b can be executed in parallel or sequentially (node 682a followed by node 682b, or vice versa) depending on the available resources at the neural network hardware accelerator.

Figure 6E:
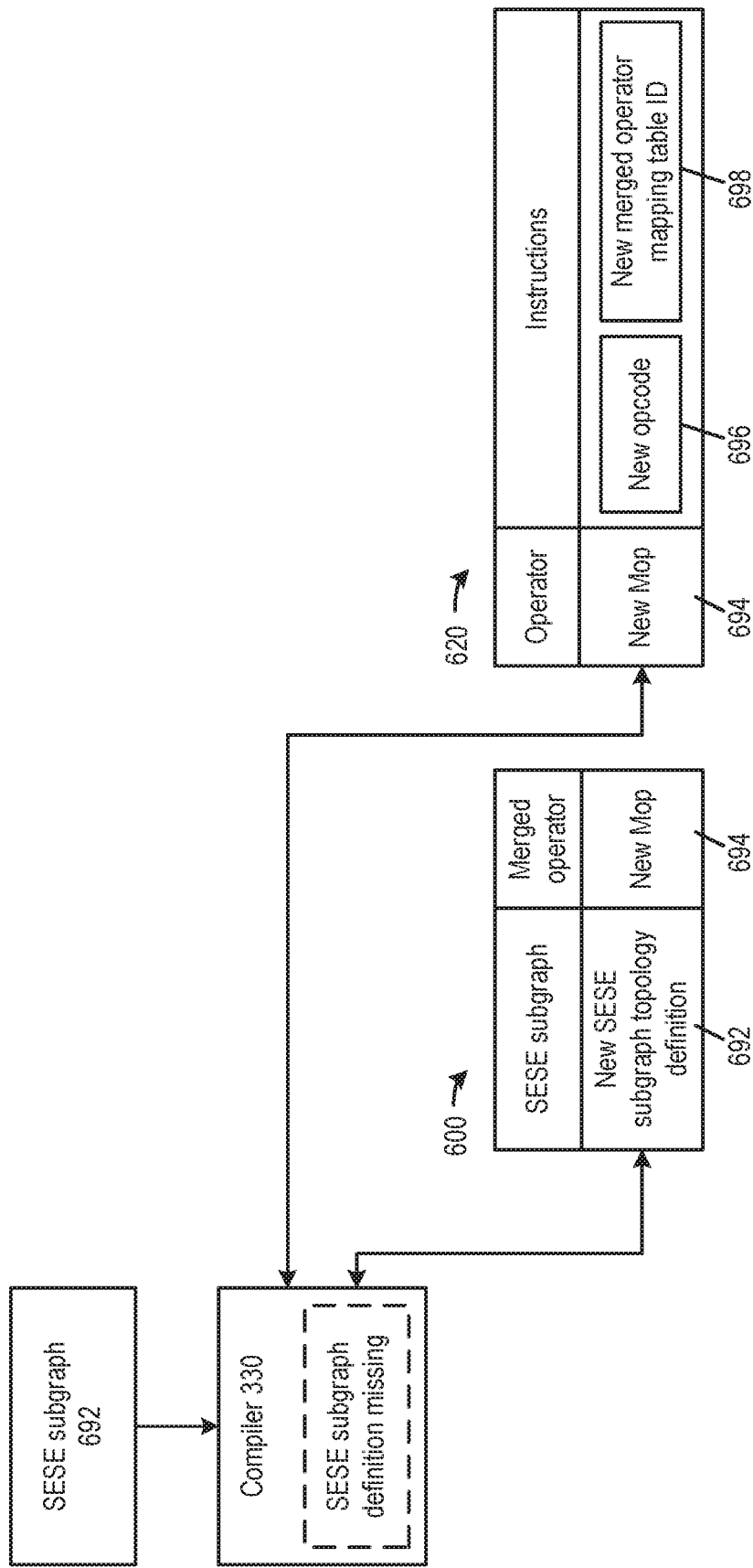

In some cases, compiler 330 may receive a SESE graph for which the topology definition and merged operator definition are not found in SESE-subgraph-to-merged-operator mapping table 600, and for which no opcode and no merged operator mapping table are found in instruction mapping table 620. In some examples, compiler 330 can store a new SESE graph topology definition and a new merged operator definition in SESE-subgraph-to-merged-operator mapping table 600, and a new opcode and a new merged operator mapping table identifier in instruction mapping table 620. FIG. 6E illustrates an example of operations of compiler 330 when encountering a SESE graph 692 that it cannot find in SESE-subgraph-to-merged-operator mapping table 600. As shown in FIG. 6E, compiler 330 can create a new SESE subgraph topology definition 692 representing SESE subgraph 692, and a new merge operator ("new mop") 694, and store both in SESE-subgraph-to-merged-operator mapping table 600. Moreover, compiler 330 can also create a new instruction including a new opcode 696 and a new merged operator mapping table identifier 698, and store both in instruction mapping table 620. Compiler 330 can then replace SESE subgraph 692 in a computational dataflow graph with new merged operator 694, and traverse the computational dataflow graph again to generate a set of instructions, including an instruction including new opcode 696 and new merged operator mapping table identifier 698, as described in FIG. 6D.

In addition, as to be described below, compiler 330 can also create a new merged operator mapping table, and store the new merged operator mapping table in a hardware accelerator that is to execute the instructions generated by compiler 330 from SESE subgraph 692. Compiler 330 can create a new merged operator mapping table by translating a sequence of operators in SESE subgraph 692 into a sequence of software functions, and inputting a set of input values (e.g., x0, x1, x2, x3, etc., of FIG. 5B) into the sequence of software functions to generate a set of corresponding output values to provide a piecewise polynomial approximation of SESE subgraph 692.

Figure 7A:
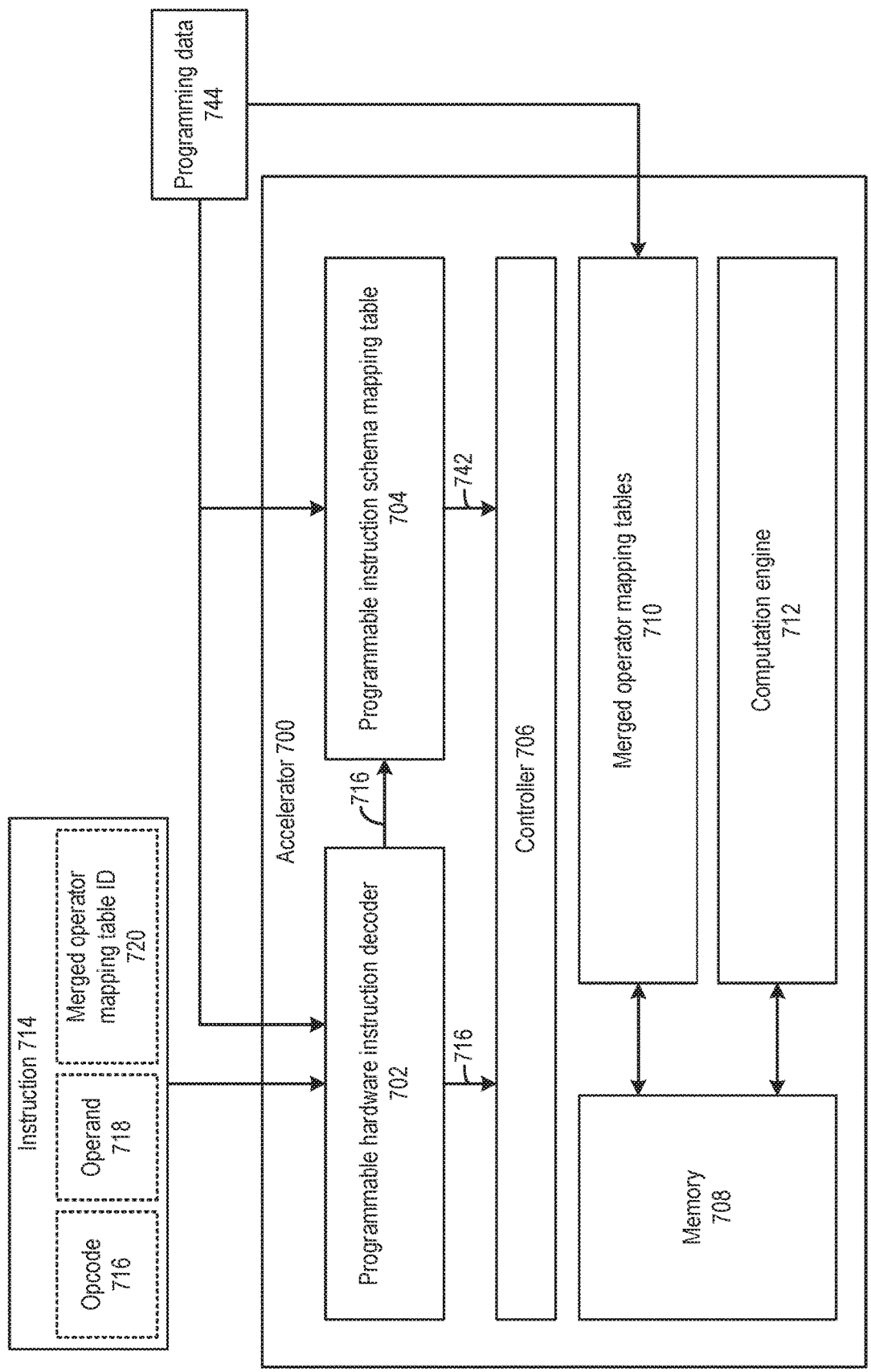
FIG. 7A, FIG. 7B, FIG. 7C, FIG. 7D, FIG. 7E, and FIG. 7F illustrate examples of a neural network hardware accelerator that supports instructions representing merged operators.

FIG. 7A, FIG. 7B, FIG. 7C, FIG. 7D, and FIG. 7E illustrate examples of a neural network hardware accelerator 700 that can support the execution of instructions of merged operators, such as program 690 of FIG. 6D. Referring to FIG. 7A, neural network hardware accelerator 700 can include a programmable hardware instruction decoder 702, a programmable instruction schema mapping table 704, a controller 706, a memory 708, merged operator mapping tables 710, and a computation engine 712. Some of these components may be part of accelerator 202 of FIG. 2. For example, memory 708 can be memory subsystem 204 of FIG. 2, whereas computation engine 712 can include processing engine array 210, results buffer 212, activation engine 216, and pooling engine 218. Merged operator mapping tables 710 can include a plurality of merged-operator mapping tables, each providing a piece-wise polynomial approximation of a merged operator, such as merged-operator mapping table 522 of FIG. 5B. Each merged-operator mapping table can be associated with a merged-operator mapping-table identifier (ID). In some examples, merged-operator mapping tables 710 can be part of a first execution unit of neural network hardware accelerator 700, whereas computation engine 712 can be part of a second execution unit of neural network hardware accelerator 700.

Specifically, neural network hardware accelerator 700 can receive an instruction 714, which may include an opcode 716 that can uniquely identify instruction 714 and/or the operations to be performed. Instruction 714 may also include an operand 718 to be operated. Operand 718 may include (or reference) data elements of an input tensor. In some examples, instruction 714 may also include a merged-operator mapping-table ID 720 that references a mapping table in merged-operator mapping tables 710, in a case where instruction 714 is for a merged operator.

Figure 7B:
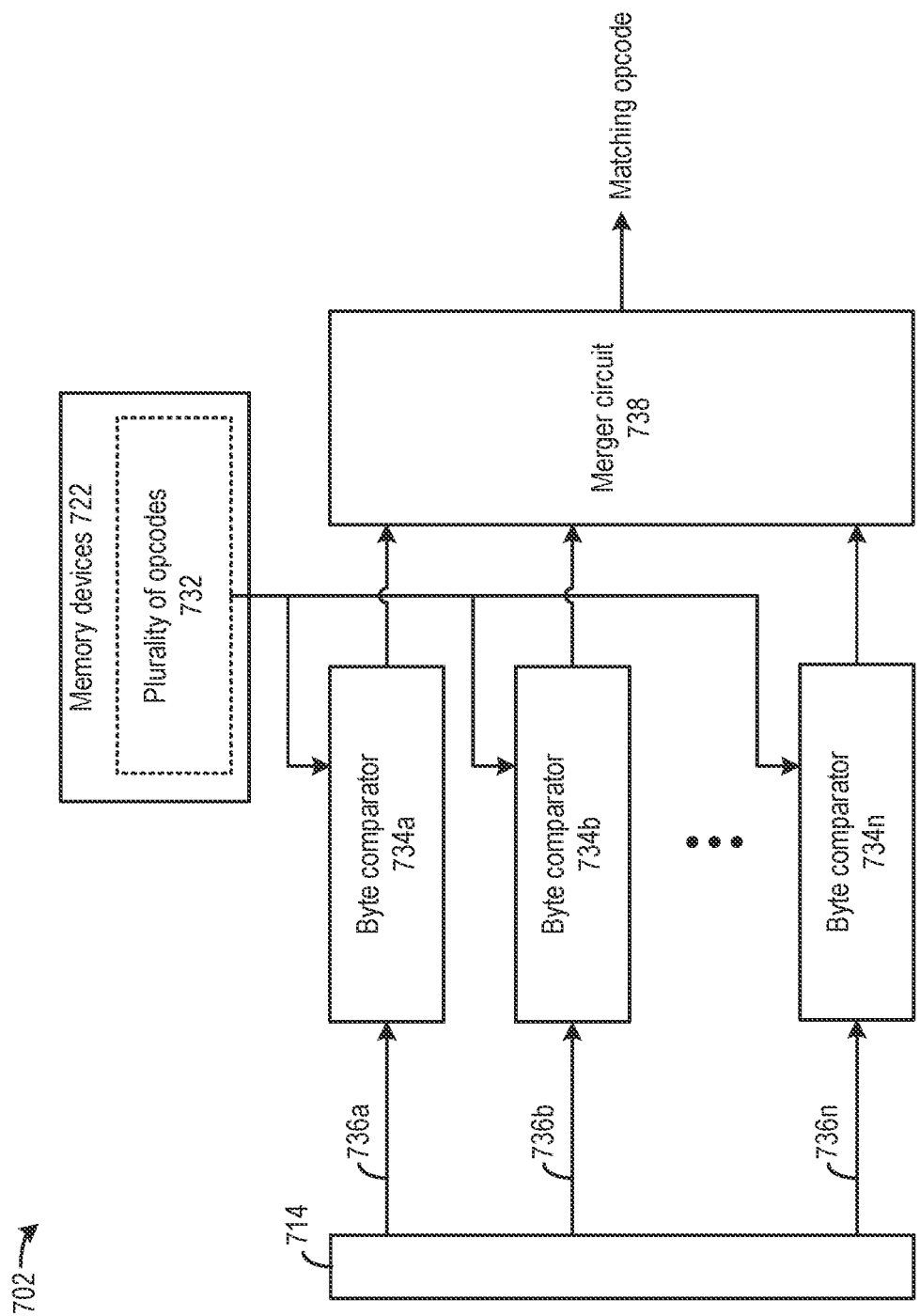
Figure 7C:
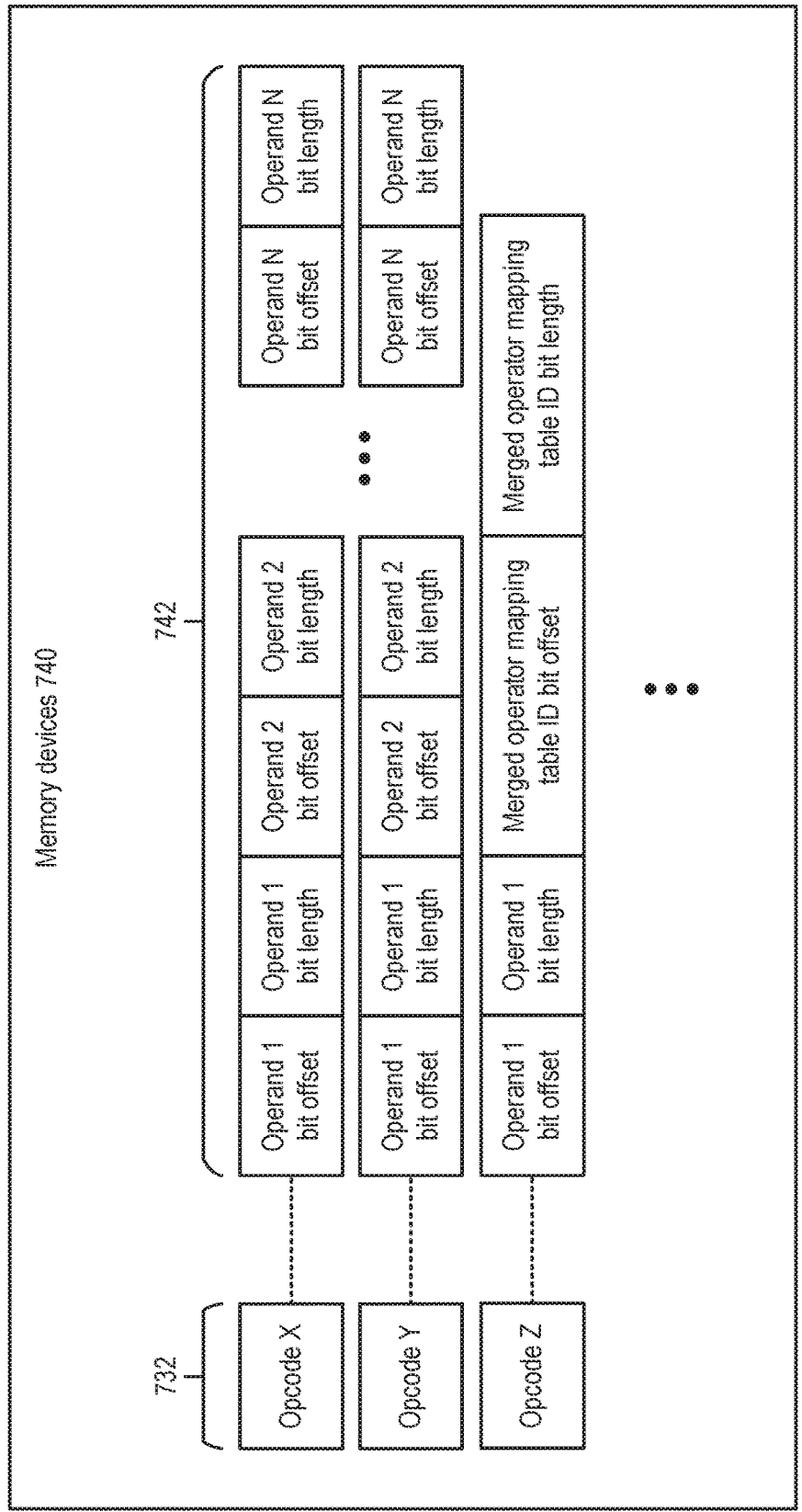

Controller 706 can control hardware instruction decoder 702 and programmable-instruction schema-mapping table 704 to decode instruction 714 and to control the operation of merged-operator mapping tables 710 and computation engine 712 based on the decoding result. FIG. 7B and FIG. 7C illustrate examples of internal components of, respectively, hardware instruction decoder 702 and programmable-instruction schema-mapping table 704. Specifically, referring to FIG. 7B, hardware instruction decoder 702 can include memory devices 722 (e.g., registers) programmed to store a plurality of opcodes 732, which can include opcode 716. Hardware instruction decoder 702 can search, in instruction 714, for an opcode that matches any of the plurality of opcodes, and output the matching opcode (e.g., opcode 716). Hardware instruction decoder 702 can include a number of byte comparators, including 734a, 734b, 734n, etc., to perform the searching. To perform the searching, instruction 714 can be segmented into a plurality of bytes 736 (e.g., 736a, 736b, 736n), with each byte fed into one of byte comparators 734 to compare with each of the plurality of opcodes 732 to search for a matching opcode. In a case where an opcode spans across one or more segmented bytes 736, subsets of bits of each of the opcode can be provided to each byte comparator to search for a matching subset of bits of the opcode. Hardware instruction decoder 702 further includes a merger circuit 738 that can include a multiplexor or other logic circuits to output the matching opcode. In a case where the opcode is completely contained in one of the segmented bytes, merger circuit 738 can select an output from one of the byte comparators as the matching opcode based on an indication from that byte comparator that the opcode is found in the byte processed by that byte comparator. Moreover, in a case where the opcode spans across one or more of the segmented bytes 736, merger circuit 738 can merge the outputs from the byte comparators that indicate that subsets of bites of the opcode are found in the bytes processed by those byte comparators.

Referring back to FIG. 7A, controller 706 can control programmable hardware instruction decoder 702 to forward the matching opcode (e.g., opcode 716) to programmable-instruction schema-mapping table 704, which can be programmed to store mappings between the plurality of opcodes and a plurality of instruction schema, and which can define bit offsets and bit lengths of one or more operands, such as operand 718, of the instructions. In a case where the instruction is for a merged operator, the instruction schema may also define the bit offset and the bit length of a merged operator mapping table identifier. Based on the opcode, programmable-instruction schema-mapping table 704 can output an instruction schema 742 to controller 706. Controller 706 may also receive opcode 716 from programmable hardware instruction decoder 702.

FIG. 7C illustrates an example internal components of programmable-instruction schema-mapping table 704. As shown in FIG. 7C, programmable-instruction schema-mapping table 704 can include memory devices 740 (e.g., registers) programmed to store a mapping between plurality of opcodes 732 and a plurality of definitions/instruction schemas 742. Each definition can define the bit offset and bit length of, for example, one or more operands, a merged-operator mapping-table identifier, etc. For example, definition 742 for opcodes X and Y includes definitions of operands, but not merged-operator mapping-table identifier, as opcodes X and Y are for instructions targeted at computation engine 712. Meanwhile, definition 742 for opcode Z includes definitions of operands and a merged-operator mapping-table identifier, as opcode Z can be for an instruction targeted at merged-operator mapping tables 710. In some examples, opcode Z itself may also include an identifier to identify a merged-operator mapping table.

Referring back to FIG. 7A, programmable hardware instruction decoder 702, programmable instruction schema mapping table 704, as well as merged operator mapping tables 710, can be programmed using programming data 744. Programming data can include, for example, an instruction schema program, which can include similar information stored in programmable instruction schema mapping table 704 described in FIG. 7B, such as opcodes, instruction schemas, and their mappings. In addition, programming data 744 can also define a set of output values for merged operator mapping tables 710 associated with a new piece-wise polynomial function.

Based on opcode 716 and/or instruction schema 742, controller 706 can control one of merged-operator mapping tables 710 or computation engine 712 to perform operations for a neural network operator represented by the instruction. For example, if the instruction includes a merged-operator mapping-table ID (or the opcode indicates such), controller 706 can control memory 708 to fetch input data (based on the operand in the instruction) to one of merged-operator mapping tables 710 referenced by the ID to generate output data. On the other hand, if the instruction does not include a merged-operator mapping-table ID (or the opcode indicates such), controller 706 can forward the opcode and the operand to computation engine 712, which can fetch input data from memory 708 based on the operand, and use processing engine array 210, results buffer 212, activation engine 216, and pooling engine 218 to perform computations based on the opcode. In some examples, computation engine 712 can be used to perform computations for both reduce-like operators (e.g., matmul, pooling, etc.) and element-wise operators (e.g., activation function processing), including element-wise operators that are not part of SESE subgraphs.

Figure 7D:
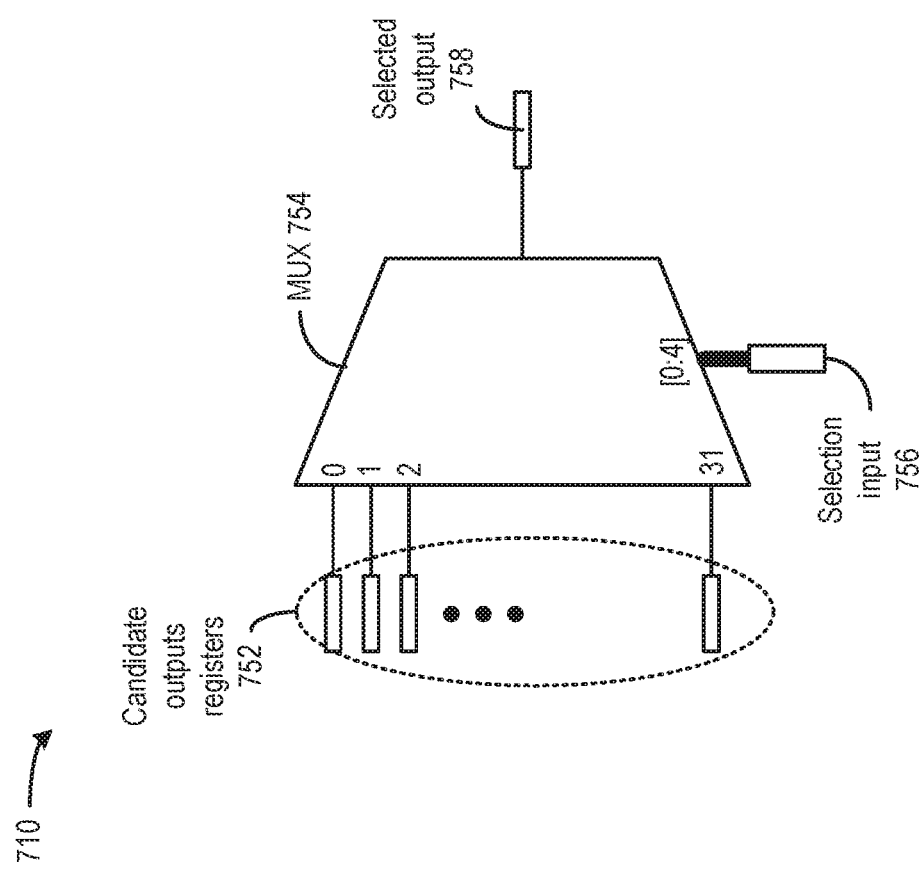

In some examples, merged operator mapping tables 710 can include registers that are dynamically programmable by programming data 744. FIG. 7D illustrates an example of a merged-operator mapping table 710. As shown in FIG. 7D, merged-operator mapping table 710 can include a plurality of candidate outputs registers 752 connected to a multiplexor (MUX) 754. MUX 754 can receive a selection input 756 to select one of candidate outputs registers 752 to provide a selected output 758. In the example of FIG. 7D, MUX 754 is a 32:1 multiplexor and can be controlled by the first five most significant bits (MSBs) of an input value, which provides the bits for selection input 756, to select output 758. Candidate outputs registers 752 can be programmed to store different candidate outputs at different times to provide different piece-wise polynomial approximations.

In some examples, merged-operator mapping tables 710 are dynamically programmable to expand the number of different sequences of element-wise neural network operators that can be approximated by the merged-operator mapping tables. For example, referring to FIG. 7E, prior to the execution of instruction 714, the registers of the merged-operator mapping table referred to by instruction 714 can be programmed to store candidate outputs 760 representing a first piece-wise polynomial that approximates a first sequence of element-wise neural network operators. When the instruction is executed, a first value can be selected from candidate outputs 760, based on an input value of operand 718, to represent a result of performing the first sequence of element-wise neural network operators on the input value. After the execution of instruction 714 completes, the registers of the same merged-operator mapping table can be programmed to store candidate outputs 762 representing a second piece-wise polynomial that approximates a second sequence of element-wise neural network operators. When the same instruction 714 is executed again, a second value can be selected from the second set of candidate output values, based on the same input value, to represent a result of performing the second sequence of element-wise neural network operators on the input value. In some examples, merged operator mapping tables 710 can be programmed when computation engine 712 performs the operations for other operators and does not require the rebooting of the neural network hardware accelerator. Such arrangements can reduce disruption to the operations of the hardware accelerator caused by the programming. Meanwhile, by reusing the same hardware resources (e.g., registers, multiplexors, etc.) to store different-merged operator mapping tables, the hardware resources needed to provide a number of different merged-operator mapping tables can be reduced.

Figure 7E:
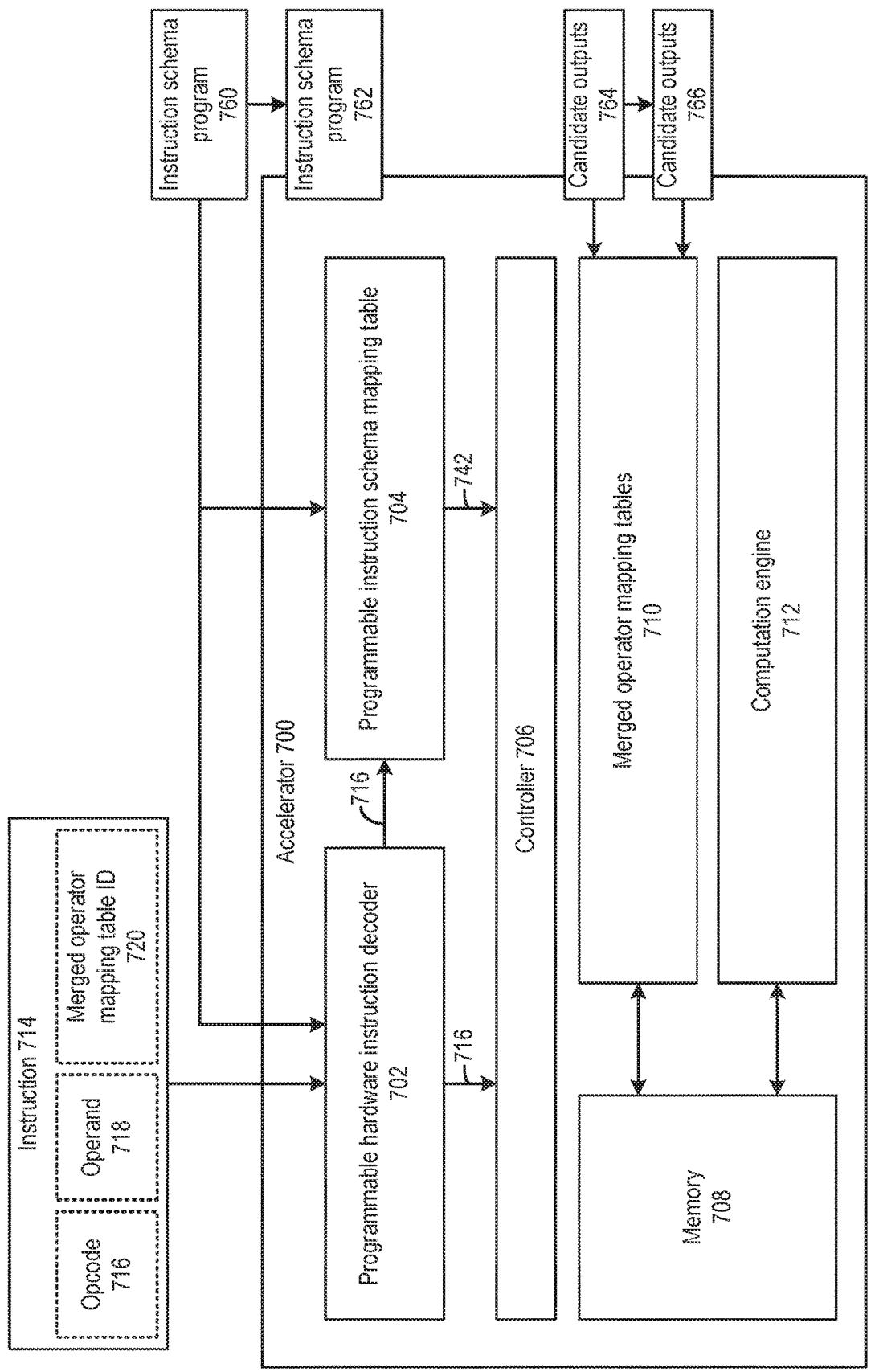

In addition, in some examples, programmable hardware instruction decoder 702 and programmable-instruction schema-mapping table 704 can also be programmed to map the same opcode to different merged-operator mapping tables, and/or to map different opcodes to the same merged-operator mapping table at different times. For example, as shown in FIG. 7E, an instruction schema program 760 may map a particular opcode 716 to a particular merged-operator mapping table ID 720, whereas an instruction schema program 762 may map a different opcode to the particular merged-operator mapping table ID 720, or the same opcode 716 to a different merged-operator mapping table ID, or to a different instruction targeted at computation engine 712. Moreover, candidate outputs 764 of merged operator mapping tables 710 can also be changed to candidate outputs 766 via programming the registers. Such arrangements can further improve flexibility and reduce hardware resources needed in the assignment of opcodes to support the number of different merged-operator mapping tables. For example, due to the dynamic programming capability, the sizes of memory devices 722 of programmable hardware instruction decoder 702 (to store opcodes) and memory devices 740 (to store opcodes and instruction schemas) can be reduced. Moreover, the number of registers needed to store the candidate outputs to implement different merged operator mapping tables can also be reduced.

Figure 7F:
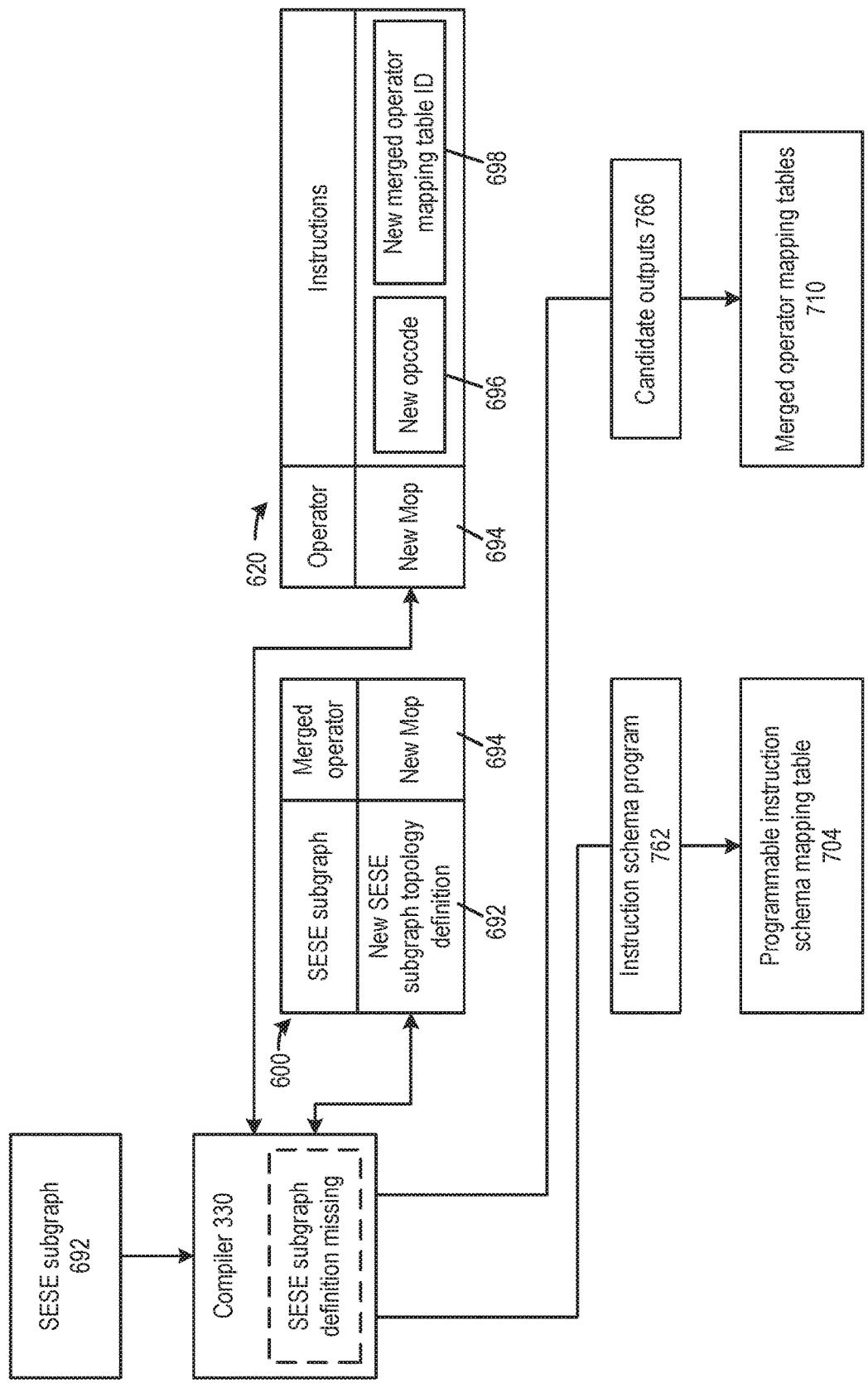

In some examples, the dynamic programming of programmable hardware instruction decoder 702, programmable-instruction schema-mapping table 704, and merged operator mapping tables 710 can be performed by compiler 330. The dynamic programming can part of a just-in-time compilation operation by compiler 330, and can be the result of compiler 330 encountering a SESE subgraph (e.g., SESE subgraph 692) that it cannot recognize in SESE-subgraph-to-merged-operator mapping table 600, as described in FIG. 6D. Referring to FIG. 7F, in such a case, compiler 330 can generate instruction schema program 762 that reflect the new instruction including new opcode 696 and new merged operator mapping table identifier 698 in instruction mapping table 620, and program instruction schema mapping table 704 using instruction schema program 762. Moreover, compiler 330 can also generate new candidate outputs 766 to reflect SESE subgraph 692, and store new candidate outputs 766 in merged operator mapping tables 710 to create a new merged operator mapping table.

Figure 8:
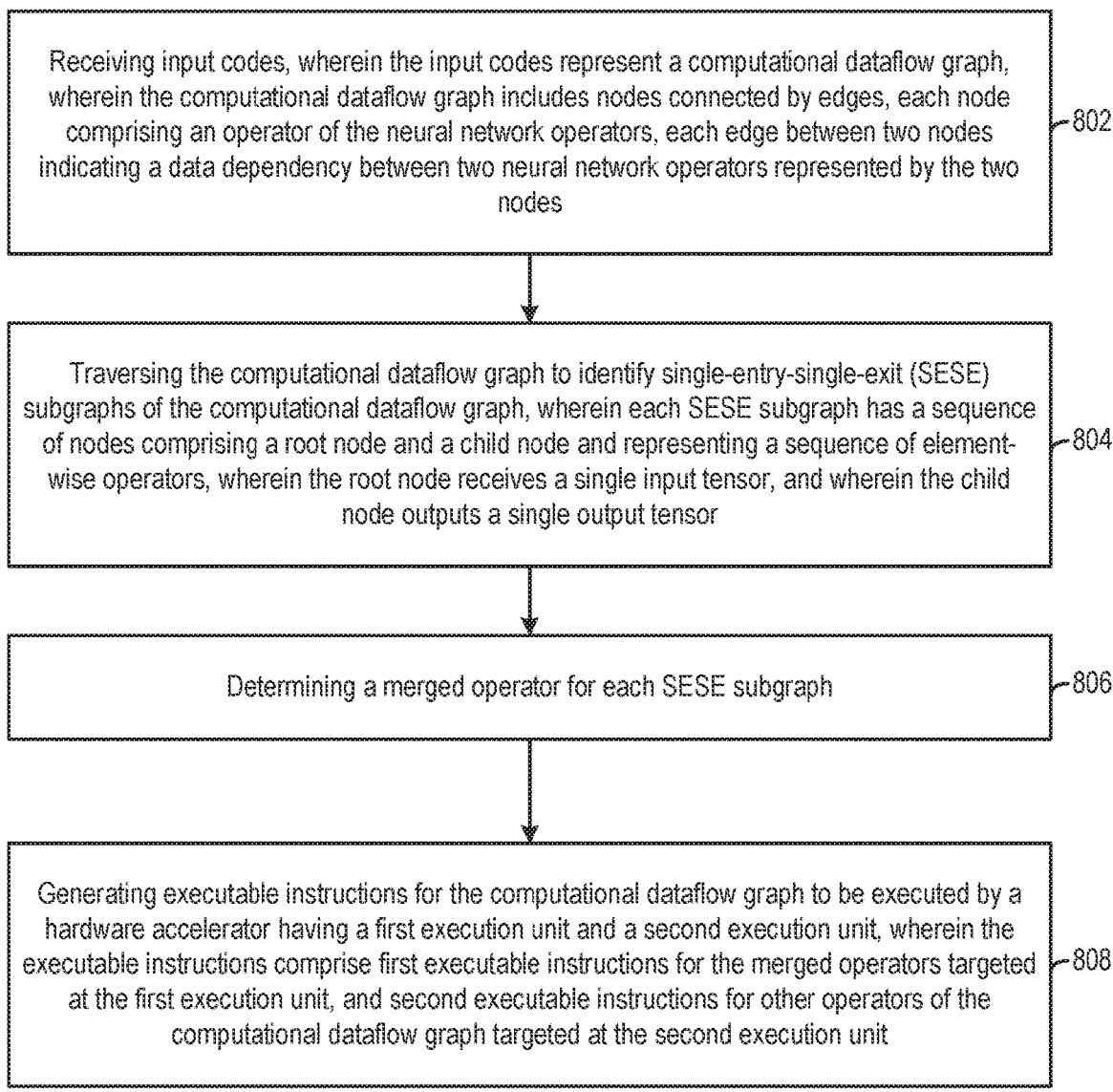
FIG. 8 includes a flowchart illustrating an example of a method of generating executable instructions associated with a neural network.

FIG. 8 illustrates an example of a method 800 of generating executable instructions to be executed by a hardware accelerator or other integrated circuit device. Method 800 can be performed by, for example, compiler 330 based on techniques described in FIG. 5A-FIG. 6E.

In step 802, the compiler can receive input codes, such as input code 342. The input codes represent a computational dataflow graph, wherein the computational dataflow graph includes nodes connected by edges, each node comprising an operator of the neural network operators, each edge between two nodes indicating a data dependency between two neural network operators represented by the two nodes. An example of the computational dataflow graph is shown in FIG. 4A. In some examples, the computational dataflow graph can include a dataflow graph of a neural network.

In step 804, the compiler can traverse the computational dataflow graph to identify single-entry-single-exit (SESE) subgraphs of the computational dataflow graph, wherein each SESE subgraph has a sequence of nodes comprising a root node and a child node and representing a sequence of element-wise operators, wherein the root node receives a single input tensor, and wherein the child node outputs a single output tensor.

Referring back to FIG. 6A, the compiler can maintain a SESE-subgraph-to-merged-operator mapping table that maps different SESE subgraphs to different merged operators. The SESE-subgraph-to-merged-operator mapping table can store the topology definitions of the SESE subgraphs, with each topology definition listing the element-wise operators included in the SESE subgraph, the edges between nodes of the element-wise operators that represent the dataflow direction, and data dependencies between the element-wise operators. The compiler can compare a subgraph obtained from the traversal of the computational dataflow graph, and compare the subgraph with each subgraph topology definition in the SESE-subgraph-to-merged-operator mapping table to identify the subgraph. Based on identifying the subgraph, the compiler can determine a merged operator for the subgraph, in step 806.

In step 808, the compiler can generate executable instructions for the computational dataflow graph to be executed by a hardware accelerator having a first execution unit and a second execution unit, wherein the executable instructions comprise first executable instructions for the merged operators targeted at the first execution unit, and second executable instructions for other operators of the computational dataflow graph targeted at the second execution unit.

Specifically, to generate the instructions, the compiler can replace the identified subgraphs in the computational dataflow graph with the merged operators from the SESE-subgraph-to-merged-operator mapping table to generate a new computational dataflow graph. A subgraph has the same topology as a SESE subgraph listed in SESE-subgraph-to-merged-operator mapping table 600 if the two subgraphs have the same set of operators, and the operators of the two subgraphs have the same edge connectivity.

In addition, after generating the new computational dataflow graph, the compiler can traverse the new computational dataflow graph to generate a program of instructions, which can also include a schedule of execution of the instructions. The compiler can refer to an instruction mapping table, such as instruction mapping table 620 of FIG. 6B, and translate each operator in the new computational dataflow graph 680 into instructions. The compiler can also determine the schedule of execution based on the data dependencies between the nodes reflected in the edge direction. The first executable instructions may include identifiers that refer to merged operator mapping tables stored in the first execution unit, whereas the second executable instructions can include opcodes that define sequences of arithmetic operations to be performed by the second execution unit.

In some examples, referring to FIG. 6E, as part of steps 804-808, the compiler may receive a SESE graph for which the topology definition and merged operator definition are not found in the SESE-subgraph-to-merged-operator mapping table, and for which no opcode and no merged operator mapping table are found in the instruction mapping table. The compiler can store a new SESE graph topology definition and a new merged operator definition in the SESE-subgraph-to-merged-operator mapping table, and a new opcode and a new merged operator mapping table identifier in the instruction mapping table. The compiler can then generate the instructions to include the new opcode and the new merged operator mapping table identifier.

Figure 9:
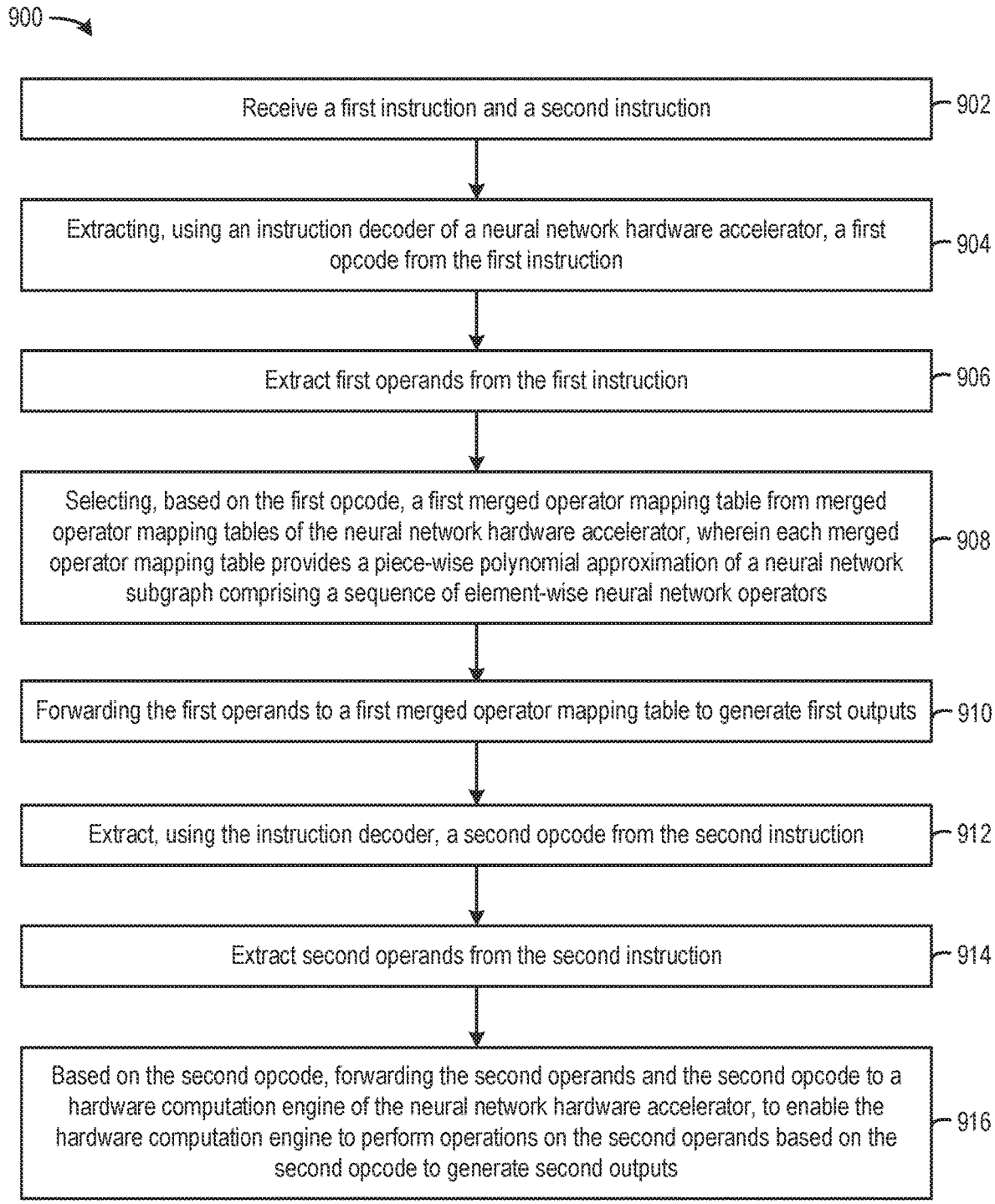
FIG. 9 illustrates a flowchart illustrating an example of performing computations at a hardware accelerator.

FIG. 9 illustrates an example of a method 900 of performing computations at a hardware accelerator, such as neural network hardware accelerator 700 of FIG. 7A (or other integrated circuit device), based on techniques described in FIG. 7A-FIG. 7F. As described above, neural network hardware accelerator 700 can include, for example, programmable hardware instruction decoder 702, programmable instruction schema mapping table 704, merged operator mapping tables 710, and a computation engine 712. Merged operator mapping tables 710 can include a plurality of merged-operator mapping tables, each providing a piece-wise polynomial approximation of a merged operator, such as merged-operator mapping table 522 of FIG. 5B. Each merged-operator mapping table can be associated with a merged-operator mapping-table identifier (ID). In some examples, merged-operator mapping tables 710 can be part of a first execution unit of neural network hardware accelerator 700, whereas computation engine 712 can be part of a second execution unit of neural network hardware accelerator 700.

In step 902, the hardware accelerator can receive a first instruction and a second instruction. Each instruction may include an opcode that can uniquely identify the instruction and/or the operations to be performed. The first instruction may further include first operands and a merged-operator mapping-table ID, which can be part of an opcode or separate from an opcode, that references a mapping table in merged-operator mapping tables 710. The second instruction may include an opcode that indicates a set of arithmetic operations to be performed at computation engine 712.

In step 904, the hardware accelerator can extract, using the instruction decoder, a first opcode from the first instruction. The extraction can be based on searching for an opcode from a plurality of opcodes stored in a memory (e.g., memory devices 722 of FIG. 7B). In some examples, the opcodes can be stored by, for example, the compiler as part of just-in-time compiling as described in FIG. 7F.

In step 906, the hardware accelerator can extract first operands from the first instruction. In some examples, the hardware accelerator can retrieve first instruction schema from instruction schema mapping table 704 based on the first opcode. The first instruction schema can define the bit positions and bit lengths of the first operands. Based on the bit positions and bit lengths definition, the hardware accelerator can extract the first operands from the first instruction. The first instruction schema can be stored by, for example, the compiler as part of just-in-time compiling as described in FIG. 7F.

In step 908, the hardware accelerator can select, based on the first opcode, a first merged operator mapping table from merged operator mapping tables of the neural network hardware accelerator, wherein each merged operator mapping table provides a piece-wise polynomial approximation of a neural network subgraph comprising a sequence of element-wise neural network operators.

Specifically, the hardware accelerator may selectively forward the first instruction to either the merged operator mapping tables or the computation engine, and the forwarding is based on the first opcode. Moreover, in some examples the first opcode may include an identifier of the first merged operator mapping table, whereas in some examples, the first opcode may be linked to the identifier of the first merged operator mapping table in the first instruction. The hardware accelerator can then select the first merged operator mapping table based on the identifier, and forward the first operands to the first merged operator mapping table to generate first outputs, in step 910.

In step 912, the hardware accelerator can also extract, using the instruction decoder, a second opcode from the second instruction. The second opcode may define a sequence of arithmetic operations to be performed by the computation engine.

In step 914, the hardware accelerator can also extract the second operands from the second instruction. In some examples, the hardware accelerator can retrieve second instruction schema from instruction schema mapping table 704 based on the second opcode, and extract the second operands based on the second instruction schema.

In step 916, the hardware accelerator can forward, based on the second opcode, the second operands and the second opcode to the hardware computation engine, to enable the hardware computation engine to perform operations on the second operands based on the second opcode to generate second outputs. Specifically, the hardware accelerator may selectively forward the second instruction to either the merged operator mapping tables or the hardware computation engine, and the forwarding to the hardware computation engine is based on the second opcode. The hardware computation engine can perform a set of arithmetic operations (e.g., multiplications, additions, etc.) based on the second opcode.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A hardware accelerator comprising:
   an instruction decoder configured to extract opcodes from instructions;
   a hardware computation engine configured to perform arithmetic operations based on the opcodes extracted from the instructions;
   merged operator mapping tables, each merged operator mapping table configured to provide a piece-wise polynomial approximation of a subgraph comprising a sequence of element-wise operators; and
   a controller configured to:
      receive a first instruction;
      extract, using the instruction decoder, a first opcode from the first instruction;
      extract first operands from the first instruction;
      select a first merged operator mapping table from the merged operator mapping tables;
      based on the first opcode, forward the first operands to the first merged operator mapping table to generate first outputs.

2. The hardware accelerator of claim 1, wherein the controller is further configured to:
   receive a second instruction;
   extract, using the instruction decoder, a second opcode from the second instruction;
   extract second operands from the second instruction; and
   based on the second opcode, forward the second operands and the second opcode to the hardware computation engine, to enable the hardware computation engine to perform operations on the second operands based on the second opcode to generate second outputs.

3. The hardware accelerator of claim 1, wherein the first merged operator mapping table is programmable to:
   store, at a first time, a first set of candidate outputs to provide a first piece-wise polynomial approximation; and
   store, at a second time, a second set of candidate outputs to provide a second piece-wise polynomial approximation.

4. The hardware accelerator of claim 1, wherein the merged-operator mapping tables are part of a first execution unit of the hardware accelerator and the hardware computation engine is part of a second execution unit of the hardware accelerator.

5. The hardware accelerator of claim 1, wherein the first instruction includes a merged-operator mapping-table identifier (ID) associated with the first merged operator mapping table.

6. The hardware accelerator of claim 1, wherein the controller is further configured to:
   retrieve first instruction schema from an instruction schema mapping table based on the first opcode, the first instruction schema defining bit positions and bit lengths of the first operands.

7. The hardware accelerator of claim 1, wherein the hardware accelerator is a neural network accelerator.

8. A method comprising:
   receiving a first instruction;
   extracting, using an instruction decoder of a hardware accelerator, a first opcode from the first instruction, wherein the hardware accelerator includes a hardware computation engine configured to perform arithmetic operations based on opcodes extracted from instructions;

extracting first operands from the first instruction;

selecting a first merged operator mapping table from merged operator mapping tables of the hardware accelerator, each merged operator mapping table configured to provide a piece-wise polynomial approximation of a subgraph comprising a sequence of element-wise operators; and based on the first opcode, forwarding the first operands to the first merged operator mapping table to generate first outputs.

9. The method of claim 8, further comprising:

receiving a second instruction;

extracting, using the instruction decoder, a second opcode from the second instruction;

extracting second operands from the second instruction; and based on the second opcode, forwarding the second operands and the second opcode to the hardware computation engine, to enable the hardware computation engine to perform operations on the second operands based on the second opcode to generate second outputs.

10. The method of claim 8, further comprising:

storing, by the first merged operator mapping table at a first time, a first set of candidate outputs to provide a first piece-wise polynomial approximation; and storing, by the first merged operator mapping table at a second time, a second set of candidate outputs to provide a second piece-wise polynomial approximation.

11. The method of claim 8, wherein the merged-operator mapping tables are part of a first execution unit of the hardware accelerator and the hardware computation engine is part of a second execution unit of the hardware accelerator.

12. The method of claim 8, wherein the first instruction includes a merged-operator mapping-table identifier (ID) associated with the first merged operator mapping table.

13. The method of claim 8, further comprising:

retrieving first instruction schema from an instruction schema mapping table based on the first opcode, the first instruction schema defining bit positions and bit lengths of the first operands.

14. The method of claim 8, wherein the hardware accelerator is a neural network accelerator.

15. A non-transitory computer readable medium having stored therein instructions that, when executed by one or more processors, cause the one or more processors to perform operations comprising:

receiving a first instruction;

extracting, using an instruction decoder of a hardware accelerator, a first opcode from the first instruction, wherein the hardware accelerator includes a hardware computation engine configured to perform arithmetic operations based on opcodes extracted from instructions;

extracting first operands from the first instruction;

selecting a first merged operator mapping table from merged operator mapping tables of the hardware accelerator, each merged operator mapping table configured to provide a piece-wise polynomial approximation of a subgraph comprising a sequence of element-wise operators; and based on the first opcode, forwarding the first operands to the first merged operator mapping table to generate first outputs.

16. The non-transitory computer readable medium of claim 15, wherein the operations further comprise:

receiving a second instruction;

extracting, using the instruction decoder, a second opcode from the second instruction;

extracting second operands from the second instruction; and based on the second opcode, forwarding the second operands and the second opcode to the hardware computation engine, to enable the hardware computation engine to perform operations on the second operands based on the second opcode to generate second outputs.

17. The non-transitory computer readable medium of claim 15, wherein the operations further comprise:

storing, by the first merged operator mapping table at a first time, a first set of candidate outputs to provide a first piece-wise polynomial approximation; and storing, by the first merged operator mapping table at a second time, a second set of candidate outputs to provide a second piece-wise polynomial approximation.

18. The non-transitory computer readable medium of claim 15, wherein the merged-operator mapping tables are part of a first execution unit of the hardware accelerator and the hardware computation engine is part of a second execution unit of the hardware accelerator.

19. The non-transitory computer readable medium of claim 15, wherein the first instruction includes a merged-operator mapping-table identifier (ID) associated with the first merged operator mapping table.

20. The non-transitory computer readable medium of claim 15, wherein the operations further comprise:

retrieving first instruction schema from an instruction schema mapping table based on the first opcode, the first instruction schema defining bit positions and bit lengths of the first operands.

* * * * *